United States Patent
Li et al.

(10) Patent No.: US 11,601,958 B2
(45) Date of Patent: Mar. 7, 2023

(54) DATA TRANSMISSION METHOD AND APPARATUS

(71) Applicant: HUAWEI TECHNOLOGIES CO., LTD., Guangdong (CN)

(72) Inventors: Chaojun Li, Beijing (CN); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 76 days.

(21) Appl. No.: 17/100,558

(22) Filed: Nov. 20, 2020

(65) Prior Publication Data

US 2021/0153224 A1 May 20, 2021

Related U.S. Application Data

(63) Continuation of application No. 15/933,633, filed on Mar. 23, 2018, now Pat. No. 10,880,909, which is a
(Continued)

(51) Int. Cl.
*H04L 1/18* (2006.01)
*H04W 72/12* (2023.01)
(Continued)

(52) U.S. Cl.
CPC ....... *H04W 72/1242* (2013.01); *H04L 1/1812* (2013.01); *H04L 5/0053* (2013.01); *H04W 16/10* (2013.01); *H04W 72/0446* (2013.01)

(58) Field of Classification Search
CPC ... H04L 1/1812; H04L 5/0044; H04L 5/0053; H04W 16/10; H04W 72/0446; H04W 72/1242
See application file for complete search history.

(56) References Cited

U.S. PATENT DOCUMENTS

2006/0092876 A1 5/2006 Kwak et al.
2008/0225802 A1 9/2008 Sun et al.
(Continued)

FOREIGN PATENT DOCUMENTS

CN 1777332 A 5/2006
CN 1905428 A 1/2007
(Continued)

OTHER PUBLICATIONS

3GPP TS 36.211 V12.6.0 (Jun. 2015);3rd Generation Partnership Project;Technical Specification Group Radio Access Network;Evolved Universal Terrestrial Radio Access (E-UTRA);Physical channels and modulation(Release 12),total 136 pages.
(Continued)

*Primary Examiner* — Mansour Oveissi
(74) *Attorney, Agent, or Firm* — Fish & Richardson P.C.

(57) ABSTRACT

The present disclosure relates to the mobile communications field, and in particular, to a transmission resource determining technology in a wireless communications system. In a data transmission method, a network device determines a transmission resource used for data transmission, and performs data transmission with a terminal device on the determined transmission resource. A time domain resource occupied by the transmission resource in a time domain is one of N types of time domain resources, and a time length of any type of time domain resource in the N types of time domain resources is less than 1 ms. According to this method, a data transmission latency can be effectively reduced, thereby meeting a requirement for a low-latency service.

15 Claims, 9 Drawing Sheets

Related U.S. Application Data continuation of application No. PCT/CN2015/090556, filed on Sep. 24, 2015.

(51) Int. Cl.
*H04W 16/10* (2009.01)
*H04L 1/1812* (2023.01)
*H04L 5/00* (2006.01)
*H04W 72/0446* (2023.01)

(56) References Cited

U.S. PATENT DOCUMENTS

| | | | |
|---|---|---|---|
| 2010/0002655 | A1 | 1/2010 | Ofuji et al. |
| 2010/0202400 | A1 | 8/2010 | Richardson et al. |
| 2010/0246527 | A1 | 9/2010 | Montojo et al. |
| 2011/0235602 | A1 | 9/2011 | Ji et al. |
| 2011/0274081 | A1 | 11/2011 | Chun et al. |
| 2012/0106491 | A1* | 5/2012 | Yang .............. H04L 1/1861 370/329 |
| 2015/0029903 | A1 | 1/2015 | Chen et al. |
| 2016/0226637 | A1 | 8/2016 | Nory et al. |
| 2016/0345311 | A1* | 11/2016 | Chen .................. H04L 5/00 |
| 2018/0310282 | A1* | 10/2018 | Shi .................. H04L 5/0094 |

FOREIGN PATENT DOCUMENTS

| | | |
|---|---|---|
| CN | 101183896 A | 5/2008 |
| CN | 101247166 A | 8/2008 |
| CN | 101414849 A | 4/2009 |
| CN | 101599817 A | 12/2009 |
| CN | 102006623 A | 4/2011 |
| CN | 102318421 A | 1/2012 |
| CN | 103220103 A | 7/2013 |
| CN | 103997788 A | 8/2014 |
| CN | 104094663 A | 10/2014 |
| EP | 2456155 A1 | 5/2012 |
| EP | 2806590 A1 | 11/2014 |
| EP | 2908446 A1 | 8/2015 |
| RU | 2434335 C2 | 11/2011 |
| RU | 2496243 C2 | 10/2013 |
| WO | WO2015012927 A1 | 1/2015 |
| WO | WO2016069141 A1 | 5/2016 |

OTHER PUBLICATIONS

Extended European Search Report issued in European Application No. 15904418.9 dated Nov. 7, 2018, 8 pages.
International Search Report and Written Opinion issued in International Application No. PCT/CN2015/090556 dated Jun. 21, 2016, 9 pages.
Notice of Allowance issued in Russian application No. 2018114960/07(023329) dated Jan. 22, 2019, 31 pages.
Office Action issued in Australian Application No. 2015409983 dated Mar. 13, 2020, 7 pages.
Office Action issued in Chinese Application No. 201580083025.5 dated Aug. 14, 2019, 16 pages (with English translation).
Office Action issued in Chinese Application No. 201910407100.9 dated May 29, 2020, 17 pages (with English translation).
Office Action issued in Chinese Application No. 201910407100.9 dated Sep. 8, 2020, 6 pages (with English translation).
Ericsson et al., "New SI proposal: Study on Latency reduction techniques for LTE," 3GPP TSG RAN Meeting #67, RP-150465, Shanghai, China, Mar. 9-12, 2015, 8 pages.
Office Action issued in Chinese Application No. 202110187607.5 dated Nov. 15, 2021, 10 pages.

* cited by examiner

DATA TRANSMISSION METHOD AND APPARATUS

CROSS-REFERENCE TO RELATED APPLICATIONS

This application is a continuation of U.S. patent application Ser. No. 15/933,633, filed on Mar. 23, 2018, which is a continuation of International Application No. PCT/CN2015/090556, filed on Sep. 24, 2015. All of the afore-mentioned patent applications are hereby incorporated by reference in their entireties.

TECHNICAL FIELD

The present disclosure relates to the field of communications technologies, and in particular, to a data transmission method and an apparatus.

BACKGROUND

In a Long Term Evolution (LTE) system, a length of one subframe is 1 millisecond (ms), and each subframe is divided into two 0.5 ms slots (slot). In the LTE system, a transmission time interval (TTI) is a length of one subframe. For example, a physical downlink shared channel (physical downlink shared channel, PDSCH) carrying downlink data, a physical uplink shared channel (PUSCH) carrying uplink data, and a physical uplink control channel (PUCCH) carrying an acknowledgement (ACK)/a negative acknowledgement (NACK) are all designed according to the TTI length of one subframe.

In a wireless communications system, a latency is one of important factors that affect user experience. However, a requirement for a low-latency service cannot be met in an existing TTI transmission mechanism.

SUMMARY

The present disclosure provides a data communication method and an apparatus, so as to meet a requirement for a low-latency service.

According to one aspect, an embodiment of this application provides a network device, and the network device includes: a processing unit, configured to determine a transmission resource used to transmit the data, where a time domain resource occupied by the transmission resource in a time domain is one of N types of time domain resources, a time length of any type of time domain resource in the N types of time domain resources is less than 1 ms, and N is a positive integer; and a transceiver unit, configured to perform data transmission with a terminal device on the transmission resource determined by the processing unit.

According to another aspect, an embodiment of this application provides a data transmission method, and the method includes:

determining, by a network device, a transmission resource used to transmit the data, where a time domain resource occupied by the transmission resource in a time domain is one of N types of time domain resources, a time length of any type of time domain resource in the N types of time domain resources is less than 1 ms, and N is a positive integer; and performing, by the network device, data transmission with a terminal device on the determined transmission resource.

According to another aspect, an embodiment of this application provides a terminal device, and the terminal device includes: a processing unit, configured to determine a transmission resource used to transmit the data, where a time domain resource occupied by the transmission resource in a time domain is one of N types of time domain resources, a time length of any type of time domain resource in the N types of time domain resources is less than 1 ms, and N is a positive integer; and a transceiver unit, configured to perform data transmission with a network device on the transmission resource determined by the processing unit.

According to another aspect, an embodiment of this application provides a data transmission method, and the method includes:

determining, by a terminal device, a transmission resource used to transmit the data, where a time domain resource occupied by the transmission resource in a time domain is one of N types of time domain resources, a time length of any type of time domain resource in the N types of time domain resources is less than 1 ms, and N is a positive integer; and performing, by the terminal device, data transmission with a network device on the determined transmission resource.

The prior art can support only transmission with a 1-millisecond time length. In comparison with the prior art, at least one type of time domain resource less than 1 ms is introduced to shorten a transmission time interval. Therefore, a data transmission latency can be effectively reduced, so as to meet a requirement on a low-latency service.

According to the foregoing embodiments provided in this application, in a possible design, the processing unit may be a processor, and the transceiver unit may be a transceiver.

According to the foregoing embodiments provided in this application, in a possible design, the N types of time domain resources include at least one type of time domain resource in types of time domain resources whose time lengths are respectively one symbol, two symbols, three symbols, four symbols, and one slot, and the one slot includes six or seven symbols.

According to the foregoing embodiments provided in this application, in a possible design, when the transmission resource occupies at least two symbols in the time domain, the data transmitted by the transceiver unit includes a physical channel and a physical signal, and the physical signal and the physical channel are respectively located on different symbols in the at least two symbols. That is, when uplink transmission is performed between the network device and the terminal device, because the physical channel and the physical signal are transmitted in a time division manner, that is, the physical channel and the physical signal occupy different symbols. Therefore, an uplink single-carrier feature can be maintained, and power amplification efficiency is not affected. This is especially applicable to a scenario of limited uplink power.

According to the foregoing embodiments provided in this application, in a possible design, when the transmission resource occupies four symbols in the time domain, the four symbols include: $N_{RS}^{sym}$ symbols used to transmit a physical signal and $4-N_{RS}^{sym}$ symbols used to transmit a physical channel, where $N_{RS}^{sym}$ is less than 4.

According to the foregoing embodiments provided in this application, in a possible design, in the four symbols mentioned above, when $N_{RS}^{sym}$ is equal to 2, the two symbols used to transmit a physical signal are first two symbols or middle two symbols of the four symbols; or when $N_{RS}^{sym}$ is equal to 1, the one symbol used to transmit a physical signal is a first symbol or a second symbol of the four symbols. Because the one symbol used to transmit a physical signal is located in the front of the four symbols, channel estimation can be more quickly performed according to the physical signal.

According to the foregoing embodiments provided in this application, in a possible design, when the transmission resource occupies three symbols in the time domain, the three symbols include: $N_{RS}^{sym}$ symbols used to transmit a physical signal and $3-N_{RS}^{sym}$ symbols used to transmit a physical channel, where $N_{RS}^{sym}$ is less than 3.

According to the foregoing embodiments provided in this application, in a possible design, in the three symbols mentioned above, when $N_{RS}^{sym}$ is equal to 1, the one symbol used to transmit a physical signal is a first symbol or a second symbol in the three symbols.

According to the foregoing embodiments provided in this application, in a possible design, when the transmission resource determined by the processing unit occupies two symbols in the time domain, the two symbols include one symbol used to transmit a physical signal, and the one symbol used to transmit a physical signal is a first symbol or a second symbol in the two symbols.

According to the foregoing embodiments provided in this application, in a possible design, when the transmission resource determined by the processing unit occupies one symbol in the time domain, the symbol is used to transmit a physical channel.

According to the foregoing embodiments provided in this application, in a possible design, if the transmission resource determined by the processing unit occupies one slot in the time domain, when the one slot includes seven symbols, the one slot includes $N_{RS}^{sym}$ symbols used to transmit a physical signal and $7-N_{RS}^{sym}$ symbols used to transmit a physical channel, where $N_{RS}^{sym}$ is less than 7; or when the one slot includes six symbols, the one slot includes $N_{RS}^{sym}$ symbols used to transmit a physical signal and $6-N_{RS}^{sym}$ symbols used to transmit a physical channel, where $N_{RS}^{sym}$ is less than 6.

According to the foregoing embodiments provided in this application, in a possible design, the data may include a physical signal and a physical channel, and the physical channel and the physical signal are located on different resource elements RE in the transmission resource. By using this design, physical signal overheads can be reduced. However, because the physical channel and the physical signal are transmitted in a frequency division manner, there is no single-carrier feature. Therefore, this design is applicable to a downlink transmission scenario and an uplink transmission scenario in which power is not limited. In addition, when the physical signal occupies a large quantity of REs, that is, when the physical signal overheads are large, accuracy of channel estimation is relatively high, and this is applicable to a high-speed scenario. When the physical signal includes a small quantity of REs, that is, when the physical signal overheads are small, there is a relatively large quantity of resources that can be used to transmit a physical channel, and this is applicable to a low-speed scenario.

According to the foregoing embodiments provided in this application, in a possible design, the determined transmission resource includes at least one short resource block, and any short resource block in the at least one short resource block includes $N_{sc}^{RB} \times N_{sym}$ REs that occupy $N_{sc}^{RB}$ consecutive subcarriers in a frequency domain and occupy $N_{sym}$ consecutive symbols in the time domain. $N_{sym}$ is equal to a quantity of symbols occupied by the transmission resource in the time domain, and $N_{sym}$ and $N_{sc}^{RB}$ are positive integers. The any short resource block includes $N_{RS}^{RE}$ REs used to transmit the physical signal, and the $N_{RS}^{RE}$ REs used to transmit the physical signal are distributed in the frequency domain in a non-consecutive manner or in a comb shape. $N_{RS}^{RE}$ is a positive integer.

According to the foregoing embodiments provided in this application, in a possible design, the time domain resource occupied by the determined transmission resource in the time domain is one of M time units included in one subframe, and any one of the M time units is one of the N types of time domain resources.

According to the foregoing embodiments provided in this application, in a possible design, when the one subframe includes M=4 time units, the four time units are orderly a first time unit, a second time unit, a third time unit, and a fourth time unit, and the four time units included in the one subframe include:

order 1: a time length of the first time unit is four symbols, a time length of the second time unit is three symbols, a time length of the third time unit is four symbols, and a time length of the fourth time unit is three symbols; order 2: a time length of the first time unit is three symbols, a time length of the second time unit is four symbols, a time length of the third time unit is three symbols, and a time length of the fourth time unit is four symbols; order 3: a time length of the first time unit is three symbols, a time length of the second time unit is four symbols, a time length of the third time unit is four symbols, and a time length of the fourth time unit is three symbols; order 4: a time length of the first time unit is four symbols, a time length of the second time unit is three symbols, a time length of the third time unit is three symbols, and a time length of the fourth time unit is three symbols; order 5: a time length of the first time unit is three symbols, a time length of the second time unit is four symbols, a time length of the third time unit is three symbols, and a time length of the fourth time unit is three symbols; order 6: a time length of the first time unit is three symbols, a time length of the second time unit is three symbols, a time length of the third time unit is three symbols, and a time length of the fourth time unit is three symbols; or order 7: a time length of the first time unit is three symbols, a time length of the second time unit is three symbols, a time length of the third time unit is three symbols, and a time length of the fourth time unit is two symbols.

According to the foregoing embodiments provided in this application, in a possible design, the four time units included in the one subframe include: For uplink transmission, when a last symbol in the one subframe is used to transmit a sounding RS SRS, the four time units included in the one subframe are configured in the time domain according to order 4, order 5, or order 7.

According to the foregoing embodiments provided in this application, in a possible design, the four time units included in the one subframe include: When the one slot includes seven symbols and a quantity of PDCCH symbols indicated by a control format indicator CFI carried by a physical control format indicator channel PCFICH or indicated by a higher layer signaling is 0 or 1, the four time units included in the one subframe are configured in the time domain according to order 1 or order 4; or when the one slot includes seven symbols and a quantity of PDCCH symbols of a CFI or a quantity of PDCCH symbols of a higher layer signaling indicator is 2, 3, or 4, the four time units included in the one subframe are configured in the time domain according to order 2, order 3, or order 5.

According to the foregoing embodiments provided in this application, in a possible design, one of the M time units occupied by the transmission resource in the time domain is determined, so that a location of the transmission resource is limited to one subframe. Therefore, the transmission resource is not distributed on two subframes, thereby avoiding increasing complexity of a scheduler of this apparatus.

According to the foregoing embodiments provided in this application, in a possible design, when N is greater than 2, at least two types of time domain resources in the N types of time domain resources have different time lengths. Therefore, a time domain resource can be more efficiently occupied.

DESCRIPTION OF EMBODIMENTS

Figure 1:
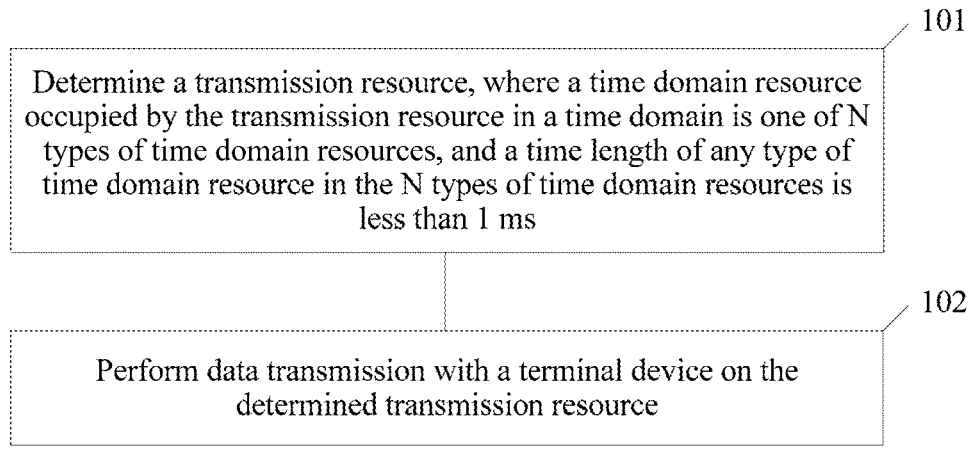
FIG. 1 is a schematic flowchart of a data transmission method according to an embodiment of the present disclosure.

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

Although an LTE system is used as an example for description in the foregoing background part, a person skilled in the art should know that the present disclosure is not only applicable to the LTE system, but also applicable to other wireless communications systems, such as Global System for Mobile Communications (GSM), a Universal Mobile Telecommunications System (UMTS), a Code Division Multiple Access (CDMA) system, and a new network system. The following describes specific embodiments by using the LTE system as an example.

A terminal device related to an embodiment of the present disclosure may be a device that provides a user with voice and/or data connectivity, a handheld device that has a wireless connection function, or another processing device connected to a wireless modem. The wireless terminal may communicate with one or more core networks by using a radio access network (RAN). The wireless terminal may be a mobile terminal such as a mobile phone (or referred to as a "cellular" phone), or a computer having a mobile terminal. For example, the wireless terminal may be a portable, pocket-sized, handheld, computer built-in, or in-vehicle mobile apparatus that exchanges voice and/or data with the radio access network. For example, the wireless terminal may be a device such as a personal communications service (PCS) phone, a cordless phone, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile, a remote station, an access point, a remote terminal, an access terminal, a user terminal, a user agent, a user device, or user equipment.

A network device related to the embodiments of the present disclosure may be a base station or an access node, or may be a device that is in an access network and that communicates with a wireless terminal on an air interface by using one or more sectors. The base station may be configured to perform mutual conversion between a received over-the-air frame and an IP packet, and serve as a router between the wireless terminal and a remaining part of the access network. The remaining part of the access network may include an Internet Protocol (IP) network. The base station may further coordinate attribute management of the air interface. For example, the base station may be a base transceiver station (BTS) in GSM or CDMA, may be a NodeB in WCDMA, or may be an evolved NodeB (eNB or e-NodeB) in LTE. This is not limited in this application.

In the prior art, in the LTE system, each radio frame includes ten 1-millisecond (ms) subframes, and each subframe may include two slots. For a normal cyclic prefix (normal CP), one slot includes seven symbols. For an extended cyclic prefix (extended CP), one slot includes six symbols. In other words, for the normal CP, each subframe includes 14 symbols, and for the extended CP, each subframe includes 12 symbols.

Symbols are classified into uplink symbols and downlink symbols. An uplink symbol is referred to as a single carrier frequency division multiple access (SC-FDMA) symbol, and a downlink symbol is referred to as an orthogonal frequency division multiplexing (OFDM) symbol. It should be noted that if an uplink multiple access manner of orthogonal frequency division multiple access (OFDMA) is introduced into a subsequent technology, the uplink symbol may also be referred to as an OFDM symbol. In the embodiments of the present disclosure, the uplink symbol and the downlink symbol are both briefly referred to as a symbol, and details are not described herein.

A physical channel related to the embodiments of the present disclosure carries data information from a high layer. The physical channel may be a physical uplink shared channel (PUSCH), a physical uplink control channel (PUCCH), or a physical downlink shared channel (PDSCH). A physical signal related to the embodiments of the present disclosure is used on a physical layer, and does not carry the data information from the higher layer. The physical signal may be a reference signal (RS), for example, a demodulation reference signal (DMRS) used for uplink, a cell-specific reference signal (CRS) used for downlink, a terminal device-specific reference signal (URS) used for downlink, or a group-specific reference signal (GRS) used for downlink. A DMRS used for PUCCH demodulation is referred to as a PUCCH DMRS, and a DMRS used for PUSCH demodulation is referred to as a PUSCH DMRS. The CRS is an RS configured by a network device for all terminal devices in a cell. The GRS is an RS configured by a network device for a group of terminal devices. The URS is an RS configured for one specific terminal device. A physical signal mentioned below is similar to the physical channel, and details are not described one by one by using examples.

The following describes various possible implementations in various specific embodiments with reference to accompanying drawings.

A technology described in the present disclosure may be applied to an LTE system or another wireless communications system using various wireless technologies, and is further applied to a subsequent evolved system of the LTE system, for example, a fifth-generation 5G system. For clarity, only the LTE system is used herein as an example for description. In the LTE system, data transmission is performed between a network device and a terminal device. For example, short TTI data transmission (that is, data transmission less than 1 ms) is introduced into the LTE system to reduce a latency. Therefore, all the embodiments of the present disclosure are applied to short TTI data transmission performed between the network device and the terminal device. For another example, in the 5G (Generation) system, a transmission time of each subframe is less than 1 ms, and further the data transmission is less than 1 ms. Therefore, all the embodiments of the present disclosure are applied to data transmission that is less than 1 ms and that is performed between the network device and the terminal device.

In an embodiment of the present disclosure, a network device determines a transmission resource used for data transmission. A time domain resource occupied by the transmission resource in a time domain is one of N types of time domain resources, and a time length of any type of time domain resource in the N types of time domain resources is less than 1 ms. The prior art can support only transmission with a 1-millisecond time length. In comparison with the prior art, at least one type of time domain resource less than 1 ms is introduced to shorten a transmission time interval. Therefore, a data transmission latency can be effectively reduced, so as to meet a requirement on a low-latency service.

It should be especially noted that the N types of time domain resources may be pre-defined by the network device and the terminal device, or be specified by a protocol, or be configured by the network device and then notified to the terminal device by using signaling. Requirements of different system bandwidths, different system loads, different coverages, different user locations, or different service types can be met by configuring N types of different time domain resources.

As shown in FIG. 1, this embodiment provides a data transmission method, and the method may include the following steps.

Step 101: A network device determines a transmission resource used to transmit the data, where a time domain resource occupied by the transmission resource in a time domain is one of N types of time domain resources, a time length of any type of time domain resource in the N types of time domain resources is less than 1 ms, and N is a positive integer.

It should be especially noted that when N is greater than or equal to 2, the N types of time domain resources related to this embodiment of the present disclosure may include N types of time domain resources whose time lengths are all less than 1 millisecond; or the N types of time domain resources may include at least one type of time domain resource whose time length is less than 1 millisecond; or the N types of time domain resources may include at least two types of time domain resources with different time lengths. The prior art can support only transmission with a 1-millisecond time length. In comparison with the prior art, at least one type of time domain resource less than 1 ms is introduced to shorten a transmission time interval. When N is greater than or equal to 2, a terminal device may perform scheduling for at least two times in 1 ms. Therefore, a data transmission latency can be effectively reduced.

The network device may adaptively determine, according to a system bandwidth, a load, a coverage requirement, a user location, a service type, or the like, the time domain resource occupied by the transmission resource in the time domain, to be adapted to a system gain (a smaller bandwidth indicates a less short TTI data transmission gain), system overheads (a smaller bandwidth indicates a larger ratio of overheads in short TTI data transmission), a coverage requirement (short TTI data transmission performed by a user closer to an edge is more limited), or a QoS requirement (a low-latency service). For example, transmission resources configured by the network device for different terminal devices, different services, different loads, or different coverage scenarios occupy different time domain resources in the time domain. Optionally, the network device may notify, by using higher layer signaling or physical layer signaling, the terminal device that a configurable time domain resource is which type or types of the N types of time domain resources. It should be noted that the network device may change the configurable time domain resource according to a requirement. Further, the network device determines that the time domain resource occupied in the time domain by the transmission resource used to transmit the data is one type of configurable time domain resource.

Correspondingly, the terminal device also needs to determine a transmission resource that transmits the data. A time domain resource occupied by the transmission resource in the time domain is one of N types of time domain resources, a time length of any type of time domain resource in the N types of time domain resources is less than 1 millisecond, and N is a positive integer. Alternatively, the terminal device also needs to determine a transmission resource used to transmit the data. A time domain resource occupied by the transmission resource in the time domain is one of N types of time domain resources, a time length of at least one type in the N types of time domain resources is less than 1 millisecond, and N is a positive integer. Optionally, the terminal device may determine, according to higher layer signaling or physical layer signaling sent by the network device, that the transmission resource used to transmit the data is one type of configurable time domain resource. The higher layer signaling or the physical layer signaling indicates that the configurable time domain resource is which type or types of the N types of time domain resources. Optionally, the terminal device may also report information to the network device. The information indicates that the terminal device needs to use which type or types of time domain resources. Then, the network device configures, as one of the N types of time domain resources according to the information, the time domain resource occupied by the transmission resource in the time domain.

In a specific implementation, the terminal device may need to simultaneously receive or send services with different latency requirements. If the services with different latency requirements are transmitted on one serving cell, a scheduler of the network device becomes very complex, and a latency requirement of a low-latency service is difficult to meet.

To resolve this technical problem, the embodiments of the present disclosure provide the following technical solutions:

When the terminal device supports carrier aggregation (CA), the network device determines a first transmission resource used to transmit first data. A time domain resource occupied by the first transmission resource in the time domain is one of N types of time domain resources. A time length of any type of time domain resource in the N types of time domain resources is less than 1 millisecond, where N is a positive integer. The first transmission resource is located in a first serving cell. The network device determines a second transmission resource used to transmit second data, and the second transmission resource occupies 1 ms or one subframe in the time domain, and is located in a second serving cell. The first serving cell and the second serving cell are located on different carriers, that is, the first transmission resource is located on a first carrier, and the second transmission resource is located on a second carrier. The terminal device may simultaneously receive the first data in the first serving cell and the second data in the second serving cell, that is, the terminal device may simultaneously receive the first data on the first carrier and the second data on the second carrier. It should be noted that all solutions provided in this embodiment of the present disclosure are applicable to the first data and the first transmission resource.

Correspondingly, when the terminal device supports carrier aggregation, the terminal device determines a first transmission resource used to transmit first data. A time domain resource occupied by the first transmission resource in the time domain is one of N types of time domain resources. A time length of any type of time domain resource in the N types of time domain resources is less than 1 millisecond, where N is a positive integer. The first transmission resource is located in a first serving cell. The terminal device determines a second transmission resource used to transmit second data, and the second transmission resource occupies 1 ms or one subframe in the time domain, and is located in a second serving cell.

Scheduling performed by the network device is more simple and flexible by using the foregoing solution, that is, services with different latency requirements may be configured in different serving cells. For example, the network device may configure a low-latency service in the first serving cell, and configure a non-low-latency service in the second serving cell.

Step 102: The network device performs data transmission with a terminal device on the determined transmission resource.

Specifically, when the data is uplink data, the network device receives, on the transmission resource, the uplink data sent by the terminal device; or when the data is downlink data, the network device sends the downlink data to the terminal device on the transmission resource.

Correspondingly, after the terminal device determines the transmission resource used to transmit the data, when the data is uplink data, the terminal device sends the uplink data on the transmission resource; or when the data is downlink data, the terminal device receives, on the transmission resource, the downlink data sent by the network device.

In the foregoing processing, a network device determines the transmission resource used to transmit data. The time domain resource occupied by the transmission resource in the time domain is one of the N types of time domain resources. A time length of any type of time domain resource in the N types of time domain resources is less than 1 ms. The prior art can support only transmission with a 1-millisecond time length. In comparison with the prior art, at least one type of time domain resource less than 1 ms is introduced to shorten a transmission time interval. Therefore, a data transmission latency can be effectively reduced, so as to meet a requirement on a low-latency service.

The following describes in detail some specific implementation solutions of the foregoing embodiments. The network device determines, in the following manner, the transmission resource used to transmit the data, and the terminal device also determines, in the following manner, the transmission resource used to transmit the data. Details are provided below.

The N types of time domain resources mentioned above may include at least one type of time domain resource in types of time domain resources whose time lengths are respectively one symbol, two symbols, three symbols, four symbols, and one slot, and the one slot may include six or seven symbols. For example, when N is equal to 2, the two types of time domain resources may include a time domain resource whose time length is three symbols and a time domain resource whose time length is four symbols. For example, when N is equal to 1, the type of time domain resources are time domain resources whose time lengths may be respectively one symbol, two symbols, three symbols, four symbols, or one slot. The following describes some cases of the transmission resource by using an example. Alternatively, the N types of time domain resources mentioned above may include at least one type of time domain resource in types of time domain resources whose time lengths are respectively one symbol, two symbols, three symbols, four symbols, one slot, and one subframe. Alternatively, the N types of time domain resources mentioned above may include at least one type of time domain resource in types of time domain resources whose time lengths are d ms or 1 ms, and d is less than 1 and greater than 0.

In a case, when the transmission resource may occupy at least two symbols in the time domain, the data may include a physical channel and a physical signal, and the physical signal and the physical channel are respectively located on different symbols in the at least two symbols. That is, when uplink transmission is performed between the network device and the terminal device, because the physical channel and the physical signal are transmitted in a time division manner, that is, the physical channel and the physical signal occupy different symbols. Therefore, an uplink single-carrier feature can be maintained. This is especially applicable to a scenario of limited uplink power.

Specifically, for example, in a scenario in which the transmission resource occupies at least two symbols in the time domain, for PUCCH transmission, the data may include a PUCCH and a PUCCH DMRS. The PUCCH and the PUCCH DMRS are located on difference symbols; or for PUSCH transmission, the data may include a PUSCH and a PUSCH DMRS, and the PUSCH and the PUSCH DMRS are located on different symbols. The foregoing is merely an example in this embodiment of the present disclosure. The present disclosure includes this but is not limited thereto.

In an example, when the determined transmission resource used to transmit the data occupies four symbols in the time domain, the four symbols may include: $N_{RS}^{sym}$ symbols used to transmit a physical signal and $4-N_{RS}^{sym}$ symbols used to transmit a physical channel, where $N_{RS}^{sym}$ is less than 4.

Figure 2:
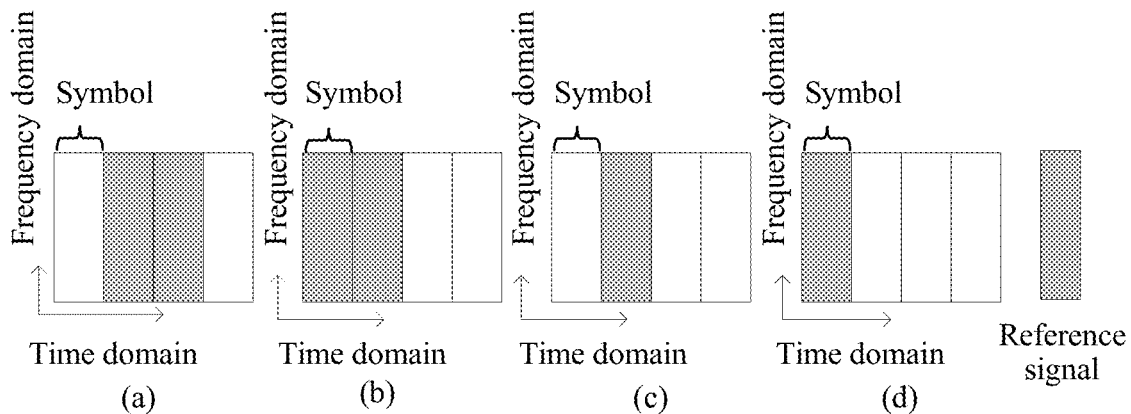
FIG. 2 is a schematic structural diagram of four symbols occupied by a transmission resource in a time domain according to an embodiment of the present disclosure.

Specifically, as shown in (a) or (b) in FIG. 2, when $N_{RS}^{sym}$ is equal to 2, the two symbols used to transmit a physical signal may be located on first two symbols or middle two symbols of the four symbols; or as shown in (c) or (d) in FIG. 2, when $N_{RS}^{sym}$ is equal to 1, the one symbol used to transmit a physical signal may be a first symbol or a second symbol of the four symbols. When the one symbol used to transmit a physical signal is located in a front location of example symbols described below, channel estimation can be more quickly performed according to a reference signal. It should be noted that the four symbols are four symbols occupied by the transmission resource in the time domain.

As described above, when the data transmission is PUCCH transmission and data carried by the PUCCH is hybrid automatic repeat request (HARQ) information, optionally, $N_{RS}^{sym}$ is equal to 2, that is, the four symbols may include two symbols used to transmit a PUCCH DMRS and two symbols used to transmit a PUCCH. In this case, PUCCH transmission of 12 terminal devices at most can be multiplexed on one short resource block (SRB) (because a PUCCH and a PUCCH DMRS both occupy two symbols in the time domain, there may be two orthogonal codes in the time domain, and there are six shift sequences in a frequency domain, so that a total of 2×6=12 orthogonal resources are supported.).

Optionally, when $N_{RS}^{sym}$ is equal to 1 or 3, PUCCH transmission of six terminal devices at most can be multiplexed on one SRB (because a PUCCH or a PUCCH DMRS occupies only one symbol in the time domain, there is only one orthogonal code in the time domain, and there are six shift sequences in the frequency domain, so that a total of 1×6=6 orthogonal resources are supported.).

As described above, when the data transmission is PUCCH transmission and data carried by the PUCCH is channel state information (CSI), optionally, $N_{RS}^{sym}$ is equal to 1, that is, the four symbols may include one symbol used to transmit a PUCCH DMRS and three symbols used to transmit a PUCCH. In this manner, the PUCCH can carry CSI with more bits.

As described above, when the data transmission is PUSCH transmission, optionally, $N_{RS}^{sym}$ is equal to 1, that is, the four symbols may include one symbol used to transmit a PUSCH DMRS and three symbols used to transmit a PUSCH. In this manner, the PUSCH can carry data with more bits.

In another example, when the determined transmission resource used to transmit the data occupies three symbols in the time domain, the three symbols include: $N_{RS}^{sym}$ symbols used to transmit a physical signal and $3-N_{RS}^{sym}$ symbols used to transmit a physical channel, and $N_{RS}^{sym}$ is less than 3.

Figure 3:
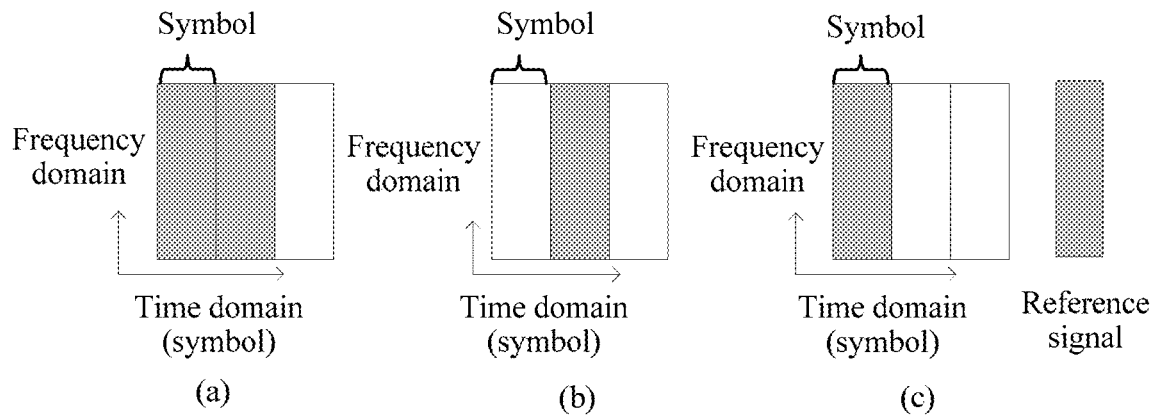
FIG. 3 is a schematic structural diagram of three symbols occupied by a transmission resource in a time domain according to an embodiment of the present disclosure.

Specifically, as shown in (a) in FIG. 3, when $N_{RS}^{sym}$ is equal to 2, the two symbols used to transmit a physical signal may be located on first two symbols of the three symbols; or as shown in (b) or (c) in FIG. 3, when $N_{RS}^{sym}$ is equal to 1, the one symbol used to transmit a physical signal is a first symbol or a second symbol of the three symbols. It should be noted that the three symbols are three symbols occupied by the transmission resource in the time domain.

As described above, when the data transmission is PUCCH transmission and data carried by the PUCCH is HARQ information or CSI, preferably, $N_{RS}^{sym}$ is equal to 1, that is, the three symbols may include one symbol used to transmit a PUCCH DMRS and two symbols used to transmit the PUCCH. In this manner, PUCCH transmission of six terminal devices at most can be multiplexed on one short resource block (because the PUCCH DMRS occupies only one symbol in the time domain, there is only one orthogonal code in the time domain, and there are six shift sequences in the frequency domain, so that a total of 1×6=6 orthogonal resources are supported), so that the PUCCH may carry CSI or HARQ feedback information with more bits.

As described above, when the data transmission is the PUSCH transmission, preferably, $N_{RS}^{sym}$ is equal to 1, that is, the three symbols may include one symbol used to transmit a PUSCH DMRS and two symbols used to transmit a PUSCH. In this manner, the PUSCH can carry data with more bits.

Figure 4:
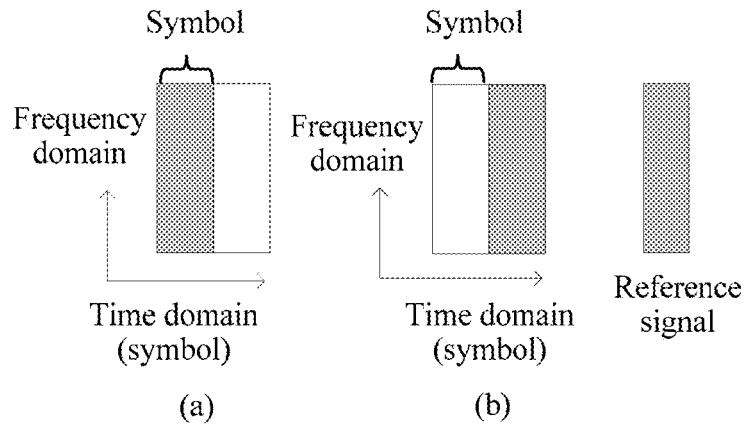
FIG. 4 is a schematic structural diagram of two symbols occupied by a transmission resource in a time domain according to an embodiment of the present disclosure.

In another example, when the determined transmission resource used to transmit the data occupies two symbols in the time domain, as shown in (a) or (b) in FIG. 4, the two symbols may include one symbol used to transmit a physical signal and one symbol used to transmit a physical channel. The symbol used to transmit a physical signal may be located on a first symbol or a second symbol in the two symbols.

In another example, when the determined transmission resource used to transmit the data occupies one symbol in the time domain, the symbol may not include a symbol used to transmit a physical signal, that is, the symbol can only be used to transmit a physical channel. Preferably, if the physical channel is a PUCCH, the symbol is applicable to only PUCCH transmission. Specifically, when HARQ information carried by the PUCCH is a NACK, a resource number of the PUCCH is a first resource number; or when HARQ information carried by the PUCCH is an ACK, a resource number of the PUCCH is a second resource number. The first resource number and the second resource number are different from each other, that is, a code sequence and/or a frequency domain resource of the PUCCH when the PUCCH carries the NACK is different from a code sequence and/or a frequency domain resource of the PUCCH when the PUCCH carries the ACK. Optionally, the network device transmits the PUCCH on the symbol when the HARQ information indicates the ACK, and does not send the PUCCH when the HARQ information indicates the NACK.

In another example, when the determined transmission resource used to transmit the data occupies one slot in the time domain and the one slot may include seven symbols, the one slot includes $N_{RS}^{sym}$ symbols used to transmit a physical signal and $7-N_{RS}^{sym}$ symbols used to transmit a physical channel, where $N_{RS}^{sym}$ is less than 7; or when the determined transmission resource used to transmit the data occupies one slot in the time domain and the one slot may include six symbols, the one slot includes $N_{RS}^{sym}$ symbols used to transmit a physical signal and $6-N_{RS}^{sym}$ symbols used to transmit a physical channel, where $N_{RS}^{sym}$ is less than 6.

Specifically, for example, if the physical signal is a PUSCH DMRS and the physical channel is a PUSCH, when the one slot may include seven symbols, the one slot may include one symbol used to transmit the PUSCH DMRS and six symbols used to transmit the PUSCH, where $N_{RS}^{sym}$ is equal to 1; or the one slot may include two symbols used to transmit the PUSCH DMRS and five symbols used to transmit the PUSCH, where $N_{RS}^{sym}$ is equal to 2.

As described above, the network device may flexibly configure a quantity of symbols of a physical signal according to a requirement. For example, the network device may send signaling to the terminal device, and the signaling may be used to indicate that $N_{RS}^{sym}$ is equal to 1 or the signaling may be used to indicate that $N_{RS}^{sym}$ is equal to 2. For another example, during frequency offset estimation or in a high-speed application scenario, the network device may configure $N_{RS}^{sym}$ as 2, otherwise, the network device may configure $N_{RS}^{sym}$ as 1. The signaling may be higher layer signaling or a physical layer signaling.

Specifically, for example, if the physical signal is a PUSCH DMRS and the physical channel is a PUSCH, when the one slot may include six symbols, the one slot may include one symbol used to transmit the PUSCH DMRS and five symbols used to transmit the PUSCH, where $N_{RS}^{sym}$ is equal to 1; or the one slot may include two symbols used to transmit the PUSCH DMRS and four symbols used to transmit the PUSCH, where $N_{RS}^{sym}$ is equal to 2.

As described above, for example, the network device may send signaling to the terminal device. The signaling may be used to indicate that $N_{RS}^{sym}$ is equal to 1, or the signaling may be used to indicate that $N_{RS}^{sym}$ is equal to 2. The signaling is higher layer signaling or a physical layer signaling.

Specifically, for example, if the physical signal is a PUCCH DMRS and the physical channel is a PUCCH, when the one slot may include seven symbols, the one slot may include two symbols used to transmit the PUCCH DMRS and five symbols used to transmit the PUCCH, where $N_{RS}^{sym}$ is equal to 2; or the one slot may include three symbols used to transmit the PUCCH DMRS and four symbols used to transmit the PUCCH, where $N_{RS}^{sym}$ is equal to 3.

Specifically, for example, if the physical signal is a PUCCH DMRS and the physical channel is a PUCCH, when the one slot includes six symbols, the one slot may include two symbols used to transmit the PUCCH DMRS and four symbols used to transmit the PUCCH, where $N_{RS}^{sym}$ is equal to 2; or the one slot may include three symbols used to transmit the PUCCH DMRS and three symbols used to transmit the PUCCH, where $N_{RS}^{sym}$ is equal to 3.

The N types of time domain resources mentioned above may include at least one type of time domain resource in types of time domain resources whose time lengths are respectively one symbol, two symbols, three symbols, four symbols, and one slot, and the one slot may include six or seven symbols. Particularly, the foregoing describes a case in which when the transmission resource may occupy at least two symbols in the time domain, the data may include a physical channel and a physical signal, and the physical signal and the physical channel are respectively located on different symbols in the at least two symbols. To better understand the solutions of the present disclosure, the following describes another case, that is, the data may include a physical signal and a physical channel, and the physical channel and the physical signal are located on different REs in the transmission resource.

Preferably, the physical signal is distributed in the frequency domain in a non-consecutive manner or in a comb shape. The transmission resource includes at least two REs.

Preferably, the transmission resource may include $N_{sc}^{RB} \times N_{RB} \times N_{sym}$ REs, that is, the transmission resource occupies $N_{sc}^{RB} \times N_{RB}$ subcarriers in the frequency domain and occupies $N_{sym}$ consecutive symbols in the time domain. $N_{RB}$ is a positive integer, $N_{sc}^{RB}$ is a positive integer, and preferably, $N_{sc}^{RB}=12$.

In this manner, physical signal overheads can be reduced. However, because the physical channel and the physical signal are transmitted in a frequency division manner, there is no single-carrier feature. Therefore, this manner is applicable to a downlink transmission scenario and an uplink transmission scenario in which power is not limited.

In addition, when the physical signal includes a large quantity of REs, that is, when the physical signal overheads are large, accuracy of channel estimation is relatively high, and this is applicable to a high-speed scenario. When the physical signal includes a small quantity of REs, that is, when the physical signal overheads are small, there is a relatively large quantity of resources that can be used to transmit a physical channel, and this is applicable to a low-speed scenario.

Specifically, for example, in the scenario in which the physical channel and the physical signal are located on different REs in the transmission resource, for PDSCH transmission, the data may include a PDSCH and a downlink (DL) reference signal. The PDSCH and the DL reference signal are located on different REs. The DL reference signal may be a CRS, a GRS, or a URS. For ease of description in the following, that the physical signal may be an RS is used as an example for description. Certainly, this is merely an example of this embodiment of the present disclosure, and the present disclosure includes the example but is not limited thereto.

Specifically, for example, in the scenario in which the physical channel and the physical signal are located on different REs in the transmission resource, for PUCCH transmission, the data may include a PUCCH and a PUCCH DMRS, and the PUCCH and the PUCCH DMRS are located on different REs; and for PUSCH transmission, the data may include a PUSCH and a PUSCH DMRS, and the PUSCH and the PUSCH DMRS are located on different REs.

In an example, when the determined transmission resource may include at least two REs, the transmission resource may include at least one short resource block. Any short resource block in the at least one short resource block includes $N_{sc}^{RB} \times N_{sym}$ REs that occupy $N_{sc}^{RB}$ consecutive subcarriers in the frequency domain and occupy $N_{sym}$ consecutive symbols in the time domain. $N_{sym}$ is equal to a quantity of symbols occupied by the transmission resource in the time domain, and $N_{sym}$ and $N_{sc}^{RB}$ are positive integers. The any short resource block includes $N_{RS}^{RE}$ REs used to transmit the physical signal, the $N_{RS}^{RE}$ REs are distributed in the frequency domain in a non-consecutive manner or in a comb shape, and $N_{RS}^{RE}$ is a positive integer.

Correspondingly, for uplink transmission, a quantity of transmit antennas is a quantity of transmit antennas supported by the terminal device. For downlink transmission, a quantity of transmit antennas is a quantity of transmit antennas supported by the network device. The following describes different quantities of transmit antennas.

Figure 5:
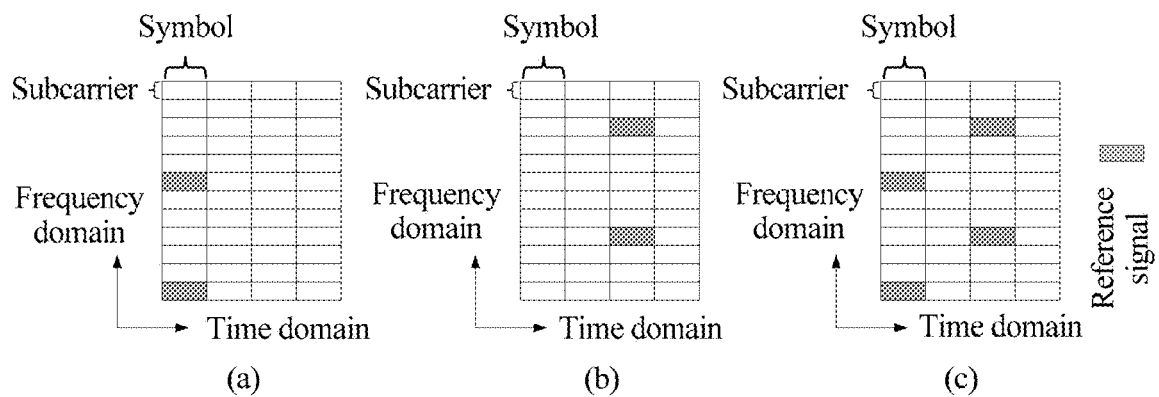
FIG. 5 is a schematic structural diagram of two or four REs included in a transmission resource according to an embodiment of the present disclosure.

For example, when the determined transmission resource used to transmit the data occupies four symbols in the time domain, and a single transmit antenna is supported, the short resource block may include two or four REs used to transmit a physical signal (such as an RS). As shown in (a) or (b) in FIG. 5, when $N_{RS}^{RE}$ is equal to 2, the two REs used to transmit the RS are located on a first symbol or a third symbol in the short resource block, and an interval between the two REs is five REs. As shown in (c) in FIG. 5, when $N_{RS}^{RE}$ is equal to four, the four REs used to transmit the RS include two REs on the first symbol and two REs on the third symbol, and an interval between the two REs respectively on the symbols is five REs.

Figure 6:
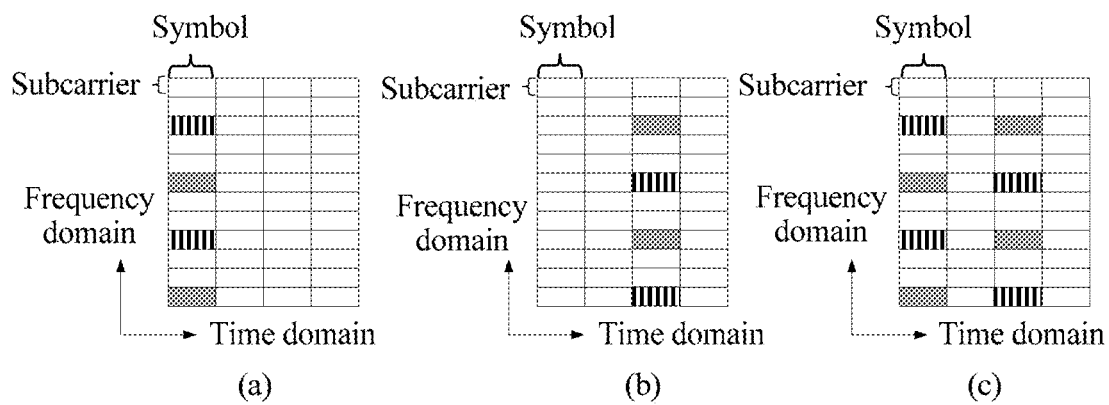
FIG. 6 is a schematic structural diagram of an RE in a short resource block according to an embodiment of the present disclosure.

For another example, when the determined transmission resource used to transmit the data occupies four symbols in the time domain, and two transmit antennas are supported, the short resource block may include two or four REs used to transmit a physical signal of a first transmit antenna, and two or four REs used to transmit a physical signal of a second transmit antenna. As shown in (a) or (b) in FIG. 6, the two REs used to transmit the RS of the first transmit antenna and the two REs used to transmit the RS of the second transmit antenna are located on the first symbol or the third symbol in the short resource block. As shown in (c) in FIG. 6, the four REs used to transmit the RS of the first transmit antenna and the four REs used to transmit the RS of the second transmit antenna are located on the first symbol and the third symbol in the short resource block.

For another example, when the determined transmission resource used to transmit the data occupies four symbols in the time domain, and four transmit antennas are supported, the short resource block may include two or four REs used to transmit a physical signal of a first transmit antenna, two or four REs used to transmit a physical signal of a second transmit antenna, two or four REs used to transmit a physical signal of a third transmit antenna, and two or four REs used to transmit a physical signal of a fourth transmit antenna.

Specifically, for example, the two REs used to transmit the RS of the first transmit antenna and the two REs used to transmit the RS of the second transmit antenna are located on the first symbol or the third symbol in the short resource block, and the two REs used to transmit the RS of the third transmit antenna and the two REs used to transmit the RS of the fourth transmit antenna are located on a second symbol or a fourth symbol in the short resource block. For another example, the four REs used to transmit the RS of the first transmit antenna and the four REs used to transmit the RS of the second transmit antenna are located on the first symbol and the third symbol in the short resource block, and the four REs used to transmit the RS of the third transmit antenna and the four REs used to transmit the RS of the fourth transmit antenna are located on the second symbol and the fourth symbol in the short resource block. For still another example, the four REs used to transmit the RS of the first transmit antenna and the four REs used to transmit the RS of the second transmit antenna are located on the first symbol and the third symbol in the short resource block, and the two REs used to transmit the RS of the third transmit antenna and the two REs used to transmit the RS of the fourth transmit antenna are located on the second symbol or the fourth symbol in the short resource block.

Further, when the transmission resource occupies four symbols in the time domain, the physical signal may be a CRS and a URS/GRS. The first symbol in the short resource block may include two or more REs used to transmit the CRS, and the third symbol in the short resource block may include two or more REs used to transmit the URS/GRS. The CRS is a CRS transmitted by the network device on a single transmit antenna. The URS/GRS is a URS/GRS transmitted by the network device on a single transmit antenna. An antenna port number of the single transmit antenna corresponding to the CRS may be the same as or different from an antenna port number of the single transmit antenna corresponding to the URS/GRS, but both antenna port numbers are corresponding to a same transmit antenna. Therefore, the terminal device may perform channel estimation on the same transmit antenna corresponding to both the CRS and the URS/GRS. It should be noted that the antenna port number is a virtual number, that is, different antenna port numbers may represent a same transmit antenna.

Further, when the transmission resource occupies four symbols in the time domain, the physical signal may be a CRS and a URS/GRS, the first symbol in the short resource block may include four or more REs used to transmit the CRS, and the third symbol in the short resource block may include four or more REs used to transmit the URS/GRS. The CRS includes a CRS transmitted by the network device on two transmit antennas, and the URS/GRS includes a URS/GRS transmitted by the network device on two transmit antennas. Antenna port numbers of the two transmit antennas corresponding to the CRS may be the same as or different from antenna port numbers of the two transmit antennas corresponding to the URS/GRS, but the two antenna port numbers corresponding to the CRS and the two antenna port numbers corresponding to the URS/GRS each are corresponding to same two transmit antennas. Therefore, the terminal device may perform channel estimation on the same two transmit antennas corresponding to both the CRS and the URS/GRS.

Further, when the transmission resource occupies four symbols in the time domain, the physical signal may be a CRS and a URS/GRS, the first symbol and the second symbol in the short resource block may include eight or more REs used to transmit the CRS, and the third symbol and the fourth symbol in the short resource block may include eight or more REs used to transmit the URS/GRS. The CRS includes a CRS transmitted by the network device on four transmit antennas, and the URS/GRS includes a URS/GRS transmitted by the network device on four transmit antennas. Antenna port numbers of the four transmit antennas corresponding to the CRS may be the same as or different from antenna port numbers of the four transmit antennas corresponding to the URS/GRS, but the four antenna port numbers corresponding to the CRS and the four antenna port number corresponding to the URS/GRS are corresponding to same four transmit antennas. Therefore, the terminal device may perform channel estimation on the same four transmit antennas corresponding to both the CRS and the URS/GRS.

Optionally, when the transmission resource occupies four symbols in the time domain, the physical signal may be a CRS and a URS/GRS, the first symbol and the second symbol in the short resource block may include eight or more REs used to transmit the CRS, and the third symbol or the fourth symbol in the short resource block may include four or more REs used to transmit the URS/GRS. The CRS includes a CRS transmitted by the network device on the four transmit antennas, and the URS/GRS includes a URS/GRS transmitted by the network device on the two transmit antennas. Antenna port numbers of two transmit antennas in the four transmit antennas corresponding to the CRS may be the same as or different from antenna port numbers of the two transmit antennas corresponding to the URS/GRS, but the two antenna port numbers corresponding to the CRS and the two antenna port numbers corresponding to the URS/GRS are corresponding to same two transmit antennas. Therefore, the terminal device may perform channel estimation on the same two transmit antennas corresponding to both the CRS and the URS/GRS.

Figure 7:
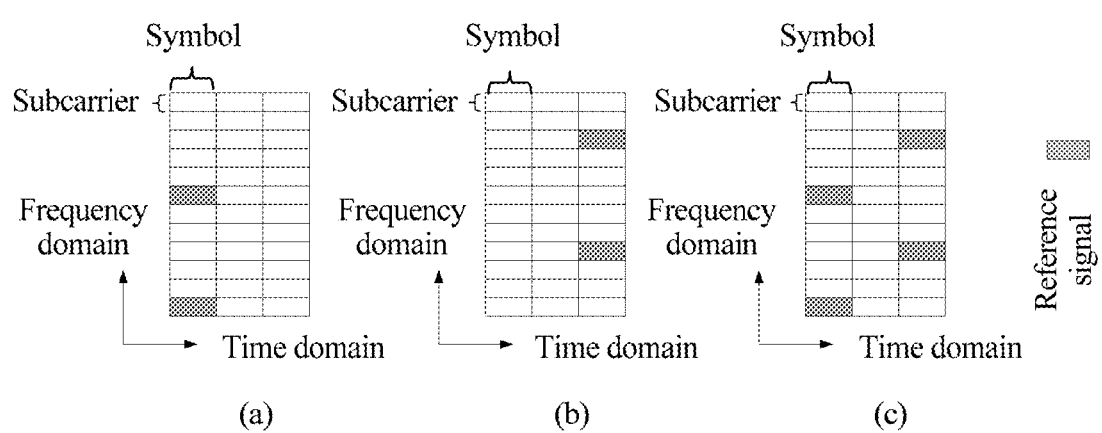
FIG. 7 is another schematic structural diagram of an RE in a short resource block according to an embodiment of the present disclosure.

For example, when the network device determines that the transmission resource used to transmit the data occupies three symbols in the time domain, and a single transmit antenna is supported, the short resource block may include two or four REs used to transmit an RS. As shown in (a) or (b) in FIG. 7, when $N_{RS}^{RE}$ is equal to 2, the two REs used to transmit an RS are located on the first symbol or the third symbol in the short resource block, and an interval between the two REs is five REs. As shown in (c) in FIG. 7, when $N_{RS}^{RE}$ is equal to 4, the four REs used to transmit an RS include two REs on the first symbol in the short resource block and two REs on the third symbol in the short resource block, and an interval between the two REs on each of the first symbol and the third symbol is five REs.

Figure 8:
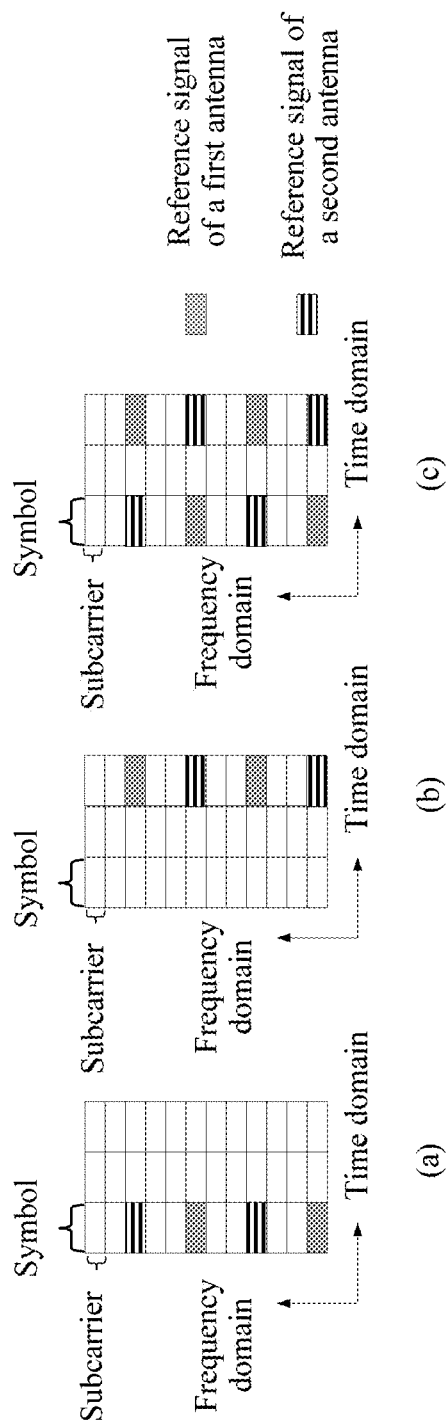
FIG. 8 is another schematic structural diagram of an RE in a short resource block according to an embodiment of the present disclosure.

For another example, when the determined transmission resource used to transmit the data occupies three symbols in the time domain, and two transmit antennas are supported, the short resource block may include two or four REs used to transmit an RS of a first transmit antenna, and two or four REs used to transmit an RS of a second transmit antenna. As shown in (a) or (b) in FIG. 8, the two REs used to transmit the RS of the first transmit antenna and the two REs used to transmit the RS of the second transmit antenna are located on the first symbol or the third symbol in the short resource block. As shown in (c) in FIG. 8, the four REs used to transmit the RS of the first transmit antenna and the four REs used to transmit the RS of the second transmit antenna are located on the first symbol and the third symbol in the short resource block.

For still another example, when the determined transmission resource used to transmit the data occupies three symbols in the time domain, and four transmit antennas are supported, the short resource block may include two or four REs used to transmit an RS of a first transmit antenna, two or four REs used to transmit an RS of a second transmit antenna, two REs used to transmit an RS of a third transmit antenna, and two REs used to transmit an RS of a fourth transmit antenna.

Specifically, for example, the two REs used to transmit the RS of the first transmit antenna and the two REs used to transmit the RS of the second transmit antenna are located on the first symbol or the third symbol in the short resource block, and the two REs used to transmit the RS of the third transmit antenna and the two REs used to transmit the RS of the fourth transmit antenna are located on the second symbol in the short resource block. For another example, the four REs used to transmit the RS of the first transmit antenna and the four REs used to transmit the RS of the second transmit antenna are located on the first symbol and the third symbol in the short resource block, and the two REs used to transmit the RS of the third transmit antenna and the two REs used to transmit the RS of the fourth transmit antenna are located on the second symbol in the short resource block.

Further, when the transmission resource occupies three symbols in the time domain, the physical signal may be a CRS and a URS/GRS. The first symbol in the short resource block may include two or more REs used to transmit the CRS, and the third symbol in the short resource block may include two or more REs used to transmit the URS/GRS. The CRS is a CRS transmitted by the network device on a single transmit antenna. The URS/GRS is a URS/GRS transmitted by the network device on a single transmit antenna. The terminal device may perform channel estimation on a same transmit antenna corresponding to both the CRS and the URS/GRS.

Optionally, when the transmission resource occupies three symbols in the time domain, the physical signal may be a CRS and a URS/GRS, the first symbol in the short resource block may include four or more REs used to transmit the CRS, and the third symbol in the short resource block may include four or more REs used to transmit the URS/GRS. The CRS includes a CRS transmitted by the network device on two transmit antennas, and the URS/GRS includes a URS/GRS transmitted by the network device on two transmit antennas. The terminal device may perform channel estimation on same two transmit antennas corresponding to both the CRS and the URS/GRS.

Optionally, when the transmission resource occupies three symbols in the time domain, the physical signal may be a CRS and a URS/GRS, the first symbol and the second symbol in the short resource block may include eight or more REs used to transmit the CRS, and the third symbol in the short resource block may include four or more REs used to transmit the URS/GRS. The CRS includes a CRS transmitted by the network device on the four transmit antennas, and the URS/GRS includes a URS/GRS transmitted by the network device on the two transmit antennas. Antenna port numbers of two transmit antennas in the four transmit antennas corresponding to the CRS may be the same as or different from antenna port numbers of the two transmit antennas corresponding to the URS/GRS, but the two antenna port numbers corresponding to the CRS and the two antenna port numbers corresponding to the URS/GRS are corresponding to same two transmit antennas. Therefore, the terminal device may perform channel estimation on the same two transmit antennas corresponding to both the CRS and the URS/GRS.

Figure 9:
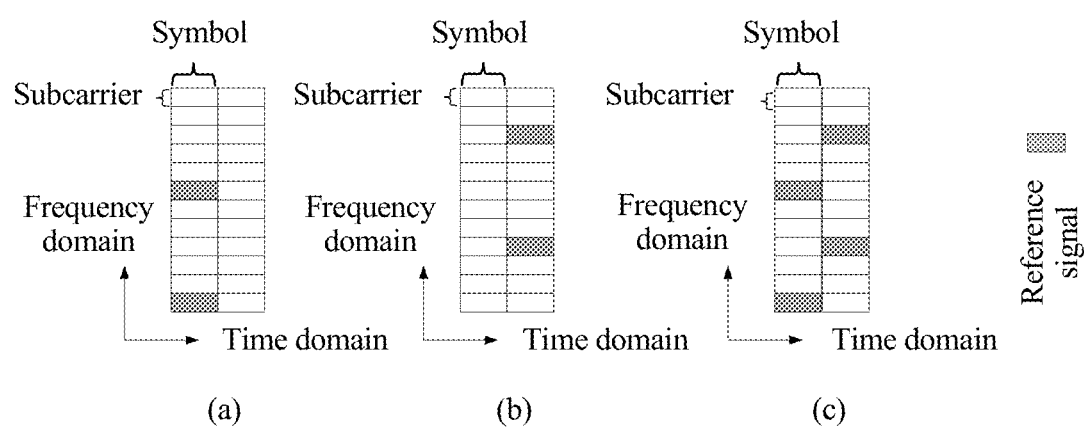
FIG. 9 is another schematic structural diagram of an RE in a short resource block according to an embodiment of the present disclosure.

For example, when the determined transmission resource used to transmit the data occupies two symbols in the time domain, and a single transmit antenna is supported, the short resource block may include two or four REs used to transmit a physical signal. As shown in (a) or (b) in FIG. 9, $N_{RS}^{RE}$ is equal to 2, the two REs used to transmit an RS are located on the first symbol or the second symbol in the short resource block, and an interval between the two REs is five REs. As shown in (c) in FIG. 9, when $N_{RS}^{RE}$ is equal to 4, the four REs used to transmit an RS include two REs on the first symbol in the short resource block and two REs on the second symbol in the short resource block, and an interval between the two REs on each of the first symbol and the third symbol is five REs.

Figure 10:
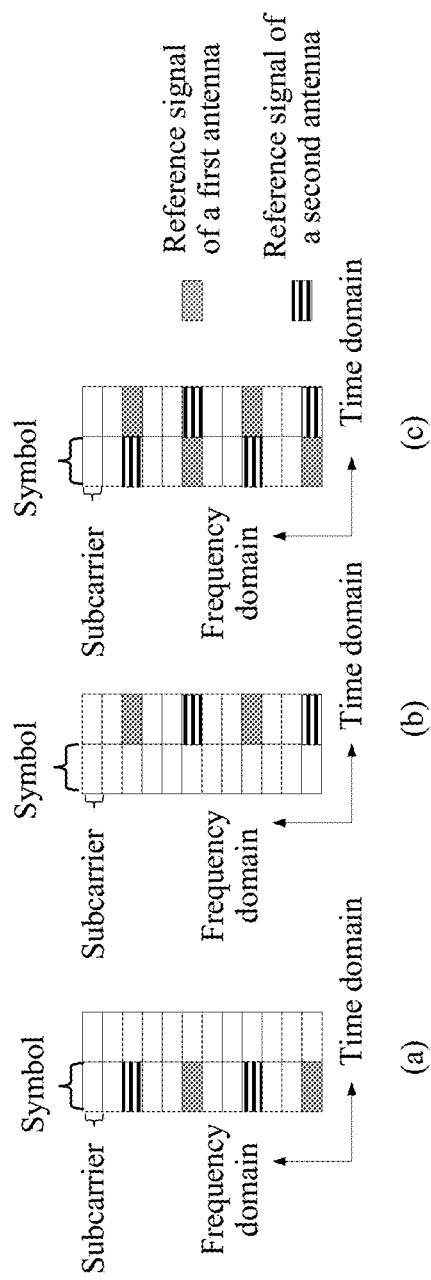
FIG. 10 is another schematic structural diagram of an RE in a short resource block according to an embodiment of the present disclosure.

For another example, when the determined transmission resource used to transmit the data occupies two symbols in the time domain, and two transmit antennas are supported, as shown in (a), (b), or (c) in FIG. 10, the short resource block may include two or four REs used to transmit a physical signal of a first transmit antenna, and two or four REs used to transmit a physical signal of a second transmit antenna.

For another example, when the determined transmission resource used to transmit the data occupies two symbols in the time domain, and four transmit antennas are supported, the short resource block may include two or three REs used to transmit a physical signal of a first transmit antenna, two or three REs used to transmit a physical signal of a second transmit antenna, two or three REs used to transmit a physical signal of a third transmit antenna, and two or three REs used to transmit a physical signal of a fourth transmit antenna.

Figure 11:
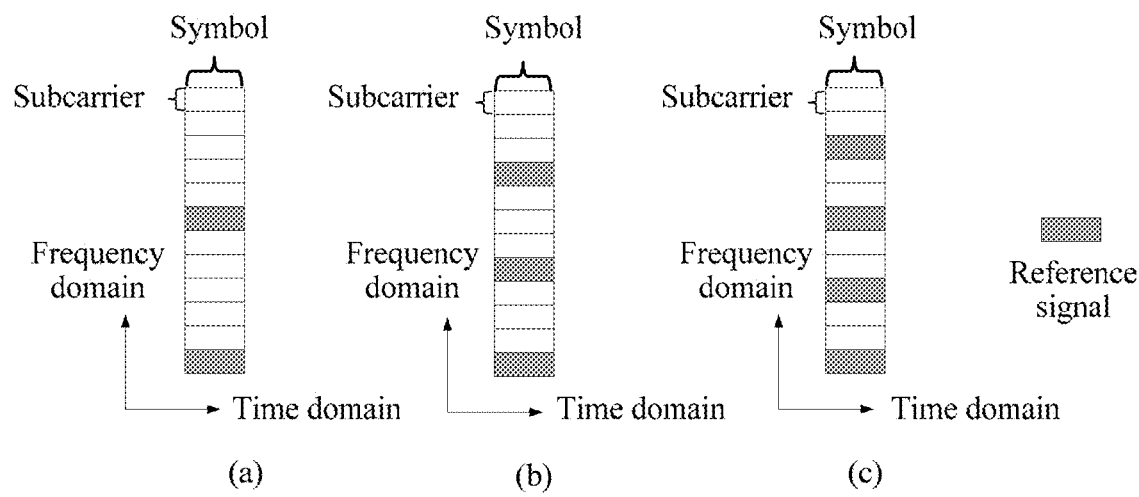
FIG. 11 is another schematic structural diagram of an RE in a short resource block according to an embodiment of the present disclosure.

For example, when the determined transmission resource used to transmit the data occupies one symbol in the time domain, and a single transmit antenna is supported, as shown in (a), (b), or (c) in FIG. 11, the short resource block may include two, three, or four REs used to transmit a physical signal.

Figure 12:
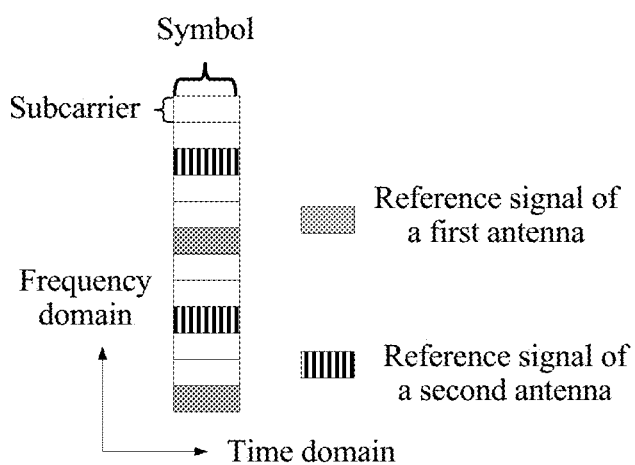
FIG. 12 is another schematic structural diagram of an RE in a short resource block according to an embodiment of the present disclosure.

For another example, when the determined transmission resource used to transmit the data occupies one symbol in the time domain, and two transmit antennas are supported, as shown in FIG. 12, the short resource block may include two, three, or four REs used to transmit a physical signal of a first transmit antenna, and two, three, or four REs used to transmit a physical signal of a second transmit antenna.

Optionally, when the determined transmission resource used to transmit the data occupies one symbol in the time domain, it is feasible to not configure four transmit antennas.

For example, when the transmission resource occupies one slot in the time domain, and a single transmit antenna is supported, the short resource block may include four, six, or eight REs used to transmit an RS.

Specifically, when the one slot includes seven symbols, and $N_{RS}^{RE}$ is equal to 4, the four REs used to transmit an RS are located on a first symbol and a fifth symbol in the short resource block; or when $N_{RS}^{RE}$ is equal to 6, the six REs used to transmit an RS are located on a first symbol, a third symbol, and a fifth symbol in the short resource block; or when $N_{RS}^{RE}$ is equal to eight, the eight REs used to transmit an RS are located on a first symbol, a third symbol, a fifth symbol, and a seventh symbol in the short resource block.

For another example, when the transmission resource occupies one slot in the time domain, and two transmit antennas are supported, the short resource block may include four, six, or eight REs used to transmit an RS of a first transmit antenna, and four, six, or eight REs used to transmit an RS of a second transmit antenna.

Specifically, for example, when the one slot includes seven symbols, the four REs used to transmit the RS of the first transmit antenna and the four REs used to transmit the RS of the second transmit antenna are located on a first symbol and a fifth symbol in the short resource block; or the six REs used to transmit the RS of the first transmit antenna and the six REs used to transmit the RS of the second transmit antenna are located on a first symbol, a third symbol, and a fifth symbol in the short resource block; or the eight REs used to transmit the RS of the first transmit antenna and the eight REs used to transmit the RS of the second transmit antenna are located on a first symbol, a third symbol, a fifth symbol, and a seventh symbol in the short resource block.

Figure 13:
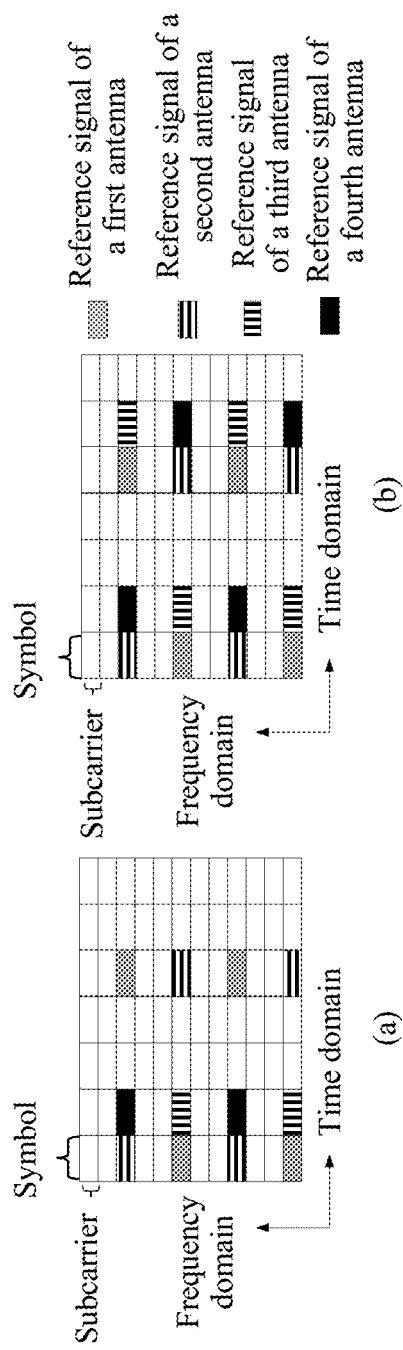
FIG. 13 is another schematic structural diagram of an RE in a short resource block according to an embodiment of the present disclosure.

For another example, when the transmission resource occupies one slot in the time domain, and four transmit antennas are supported, as shown in FIG. 13, the short resource block may include four REs used to transmit an RS of a first transmit antenna, four REs used to transmit an RS of a second transmit antenna, two or four REs used to transmit an RS of a third transmit antenna, and two or four REs used to transmit an RS of a fourth transmit antenna. For example, when the one slot includes seven symbols, the four REs used to transmit the RS of the first transmit antenna and the four REs used to transmit the RS of the second transmit antenna are located on a first symbol and a fifth symbol in the short resource block, and the two REs used to transmit the RS of the third transmit antenna and the two REs used to transmit the RS of the fourth transmit antenna are located on a second symbol in the short resource block; or the four REs used to transmit the RS of the first transmit antenna and the four REs used to transmit the RS of the second transmit antenna are located on a first symbol and a fifth symbol, and the four REs used to transmit the RS of the third transmit antenna and the four REs used to transmit the RS of the fourth transmit antenna are located on a second symbol and a sixth symbol in the short resource block.

Preferably, when the transmission resource occupies one slot in the time domain and the one slot may include seven symbols, the physical signal may be a CRS and a URS/GRS, a first symbol, a second symbol, and a fifth symbol in the short resource block may include 12 or more REs used to transmit the CRS, and a sixth symbol in the short resource block may include four or more REs used to transmit the URS/GRS. The CRS includes a CRS transmitted by the network device on four transmit antennas, and the URS/GRS includes a URS/GRS transmitted by the network device on two transmit antennas. Antenna port numbers of the four transmit antennas corresponding to the CRS may be the same as or different from antenna port numbers of the four transmit antennas corresponding to the URS/GRS, but the four antenna port numbers corresponding to the CRS and the four antenna port numbers corresponding to the URS/GRS are corresponding to same two transmit antennas. Therefore, the terminal device may perform channel estimation on the same two transmit antennas corresponding to both the CRS and the URS/GRS.

Preferably, when the transmission resource occupies one slot in the time domain, and the one slot may include six symbols, the physical signal may be a CRS and a URS/GRS, a first symbol, a second symbol, and a fourth symbol in the short resource block may include 12 or more REs used to transmit the CRS, and a fifth symbol in the short resource block may include four or more REs used to transmit the URS/GRS. The CRS includes a CRS transmitted by the network device on four transmit antennas, and the URS/GRS includes a URS/GRS transmitted by the network device on two transmit antennas. Similarly, the terminal device may perform channel estimation on the same two transmit antennas corresponding to both the CRS and the URS/GRS.

For the foregoing embodiments related to a URS/GRS, before or when the network device determines the transmission resource used to transmit the data, the network device may send signaling to the terminal device. The signaling includes information that indicates whether the URS/GRS is configured, and the signaling is physical layer signaling or higher layer signaling. When the signaling indicates that the URS/GRS is configured, the physical signal includes the URS/GRS, and details are shown in the embodiments related to the URS/GRS.

As described above, a time domain resource occupied in the time domain by a transmission resource occupied by data transmission is one of N Types of time domain resources. Therefore, the transmission resource is less than one subframe or 1 ms. Further, a location of the transmission resource on a subframe needs to be defined, and details are described below.

In an example, a time domain resource occupied by a determined transmission resource in the time domain may be one of M time units (TU) included in one subframe, and any one of the M time units is one of the N types of time domain resources.

A subframe may be divided into M time units, and a length of each time unit is less than or equal to a length of the subframe, that is, a quantity of symbols included in each time unit is less than or equal to a quantity of symbols included in the subframe. When a subframe includes a plurality of time units, the plurality of time units may include different quantities of symbols. Data transmission may be performed on each time unit, that is, data transmission may be performed in the time domain by using a time unit as a granularity.

A location of the transmission resource is limited to one subframe by using the foregoing solution. Therefore, the transmission resource is not distributed on two subframes, thereby avoiding increasing complexity of a scheduler of the network device.

Optionally, when M=2, the two time units included in the subframe include a first time unit and a second time unit. The first time unit is located in a first slot of the subframe, and the second time unit is located in a second slot of the subframe.

Optionally, when M=4, the four time units included in the subframe may include a first time unit, a second time unit, a third time unit, and a fourth time unit. The four time units included in the subframe may be sorted according to any one of the following example orders. This is merely an example used in the present disclosure. The present disclosure includes the example but is not limited thereto. It should be noted that a time length of one subframe is greater than or equal to a sum of time lengths of the four time units.

Order 1: A time length of the first time unit is four symbols, a time length of the second time unit is three symbols, a time length of the third time unit is four symbols, and a time length of the fourth time unit is three symbols. For example, one subframe is used as an example, and the subframe includes 14 symbols, that is, {#0, #1, #2, #3, #4, #5, #6, #7, #8, #9, #10, #11, #12, #13}. Therefore, in a specific implementation, an order of the time units included in the subframe may be: The first time unit is located in a first symbol set {#0, #1, #2, #3}, the second time unit is located in a second symbol set {#4, #5, #6}, the third time unit is located in a third symbol set {#7, #8, #9, #10}, and a fourth time unit is located in a fourth symbol set {#11, #12, #13}.

Order 2: A time length of the first time unit is three symbols, a time length of the second time unit is four symbols, a time length of the third time unit is three symbols, and a time length of the fourth time unit is four symbols. For example, one subframe is used as an example, and the subframe includes 14 symbols, that is, {#0, #1, #2, #3, #4, #5, #6, #7, #8, #9, #10, #11, #12, #13}. Therefore, in a specific implementation, an order of the time units included in the subframe may be: The first time unit is located in a first symbol set {#0, #1, #2}, the second time unit is located in a second symbol set {#3, #4, #5, #6}, the third time unit is located in a third symbol set {#7, #8, #9}, and a fourth time unit is located in a fourth symbol set {#10, #11, #12, #13}.

Order 3: A time length of the first time unit is three symbols, a time length of the second time unit is four symbols, a time length of the third time unit is four symbols, and a time length of the fourth time unit is three symbols. For example, one subframe is used as an example, and the subframe includes 14 symbols, that is, {#0, #1, #2, #3, #4, #5, #6, #7, #8, #9, #10, #11, #12, #13}. Therefore, in a specific implementation, an order of the time units included in the subframe may be: The first time unit is located in a first symbol set {#0, #1, #2}, the second time unit is located in a second symbol set {#3, #4, #5, #6}, the third time unit is located in a third symbol set {#7, #8, #9, #10}, and a fourth time unit is located in a fourth symbol set {#11, #12, #13}.

Order 4: A time length of the first time unit is four symbols, a time length of the second time unit is three symbols, a time length of the third time unit is three symbols, and a time length of the fourth time unit is three symbols. For example, one subframe is used as an example, and the subframe includes 14 symbols, that is, {#0, #1, #2, #3, #4, #5, #6, #7, #8, #9, #10, #11, #12, #13}. Therefore, in a specific implementation, an order of the time units included in the subframe may be: The first time unit is located in a first symbol set {#0, #1, #2, #3}, the second time unit is located in a second symbol set {#4, #5, #6}, the third time unit is located in a third symbol set {#7, #8, #9}, and a fourth time unit is located in a fourth symbol set {#10, #11, #12}.

Order 5: A time length of the first time unit is three symbols, a time length of the second time unit is four symbols, a time length of the third time unit is three symbols, and a time length of the fourth time unit is three symbols. For example, one subframe is used as an example, and the subframe includes 14 symbols, that is, {#0, #1, #2, #3, #4, #5, #6, #7, #8, #9, #10, #11, #12, #13}. Therefore, in a specific implementation, an order of the time units included in the subframe may be: The first time unit is located in a first symbol set {#0, #1, #2}, the second time unit is located in a second symbol set {#3, #4, #5, #6}, the third time unit is located in a third symbol set {#7, #8, #9}, and a fourth time unit is located in a fourth symbol set {#10, #11, #12}.

Order 6: A time length of the first time unit is three symbols, a time length of the second time unit is three symbols, a time length of the third time unit is three symbols, and a time length of the fourth time unit is three symbols. For example, one subframe is used as an example, and the subframe includes 14 symbols, that is, {#0, #1, #2, #3, #4, #5, #6, #7, #8, #9, #10, #11, #12, #13}. Therefore, in a specific implementation, an order of the time units included in the subframe may be: The first time unit is located in a first symbol set {#0, #1, #2}, the second time unit is located in a second symbol set {#3, #4, #5}, the third time unit is located in a third symbol set {#6, #7, #8}, and a fourth time unit is located in a fourth symbol set {#9, #10, #11}.

Order 7: A time length of the first time unit is three symbols, a time length of the second time unit is three symbols, a time length of the third time unit is three symbols, and a time length of the fourth time unit is two symbols. For example, one subframe is used as an example, and the subframe includes 14 symbols, that is, {#0, #1, #2, #3, #4, #5, #6, #7, #8, #9, #10, #11, #12, #13}. Therefore, in a specific implementation, an order of the time units included in the subframe may be: The first time unit is located in a first symbol set {#0, #1, #2}, the second time unit is located in a second symbol set {#3, #4, #5}, the third time unit is located in a third symbol set {#6, #7, #8}, and a fourth time unit is located in a fourth symbol set {#9, #10}.

The foregoing describes seven sorting manners of the four time units included in the subframe. A person skilled in the art may readily figure out, according to the foregoing seven sorting manners, a specific implementation corresponding to any order of the time units. Therefore, details of each order are not described.

For uplink transmission, in a specific implementation, when the subframe includes four time units, and a last symbol is used to transmit a sounding RS SRS, the four time units included in the subframe may be configured in the time domain according to order 4, order 5, or order 7. For a subframe that is not used to transmit an RS SRS, the four time units included in the subframe may be configured in the time domain according to one order in the seven orders. It should be noted that "the last symbol in the subframe is used to transmit an SRS" mentioned above indicates at least one of the following four cases: Case 1: The terminal device sends an SRS on the last symbol in the subframe, and the SRS and the data are located in a same serving cell; Case 2: The subframe is a subframe configured with a cell-specific SRS, and a bandwidth occupied by the cell-specific SRS partially or wholly overlaps with a bandwidth occupied by the data in the frequency domain; Case 3: The subframe is a terminal device-specific aperiodic SRS subframe, and the terminal device may transmit, in a serving cell of the data, the SRS on the last symbol in the subframe; or Case 4: When a plurality of timing advance groups (TAG) are configured to the terminal device, the subframe is a terminal device-specific periodic SRS subframe, and the terminal device may transmit, in a serving cell of the data, an SRS on the last symbol in the subframe. Certainly, the four cases are merely examples used in the present disclosure, and the present disclosure includes the cases but is not limited thereto.

In addition, for uplink transmission of a PUCCH, the PUCCH carries HARQ feedback information, and the HARQ feedback information indicates a receiving state of a PDSCH. In a specific implementation, when it is considered that first one, two, three, or four symbols in a downlink subframe can be used to transmit a PDCCH, and a plurality of symbols are used to transmit a PDCCH, there is a relatively small quantity of resources that can be used for PDSCH transmission in a first time unit in the downlink subframe. Therefore, there is a relatively small quantity of users schedulable in the first time unit, so that there is a relatively small quantity of users that need to transmit a PUCCH in a first time unit in an uplink subframe corresponding to the first time unit in the downlink subframe. Therefore, a time length of the first time unit may be three symbols, for example, the four time units included in the subframe may be configured in the time domain according to order 2, order 3, or order 5, that is, a time length of the first time unit in order 2, order 3, or order 5 is three symbols.

Optionally, when M=4, the subframe includes four time units, and one slot includes seven symbols. In a specific implementation, when a quantity of PDCCH symbols of a control format indicator CFI carried by a physical control format indicator channel PCFICH or a quantity of PDCCH symbols of a higher layer signaling indicator carried by the PCFICH is 0 or 1, the four time units included in the subframe may be configured in the time domain according to order 1 or order 4; or when the subframe includes four time units, and one slot includes six symbols, in a specific implementation, when a quantity of PDCCH symbols of a CFI or a quantity of PDCCH symbols of a higher layer signaling indicator is 2, 3, or 4, the four time units included in the subframe may be configured in the time domain according to order 2, order 3, or order 5.

For the network device, specifically, the time domain resource occupied in the time domain by the transmission resource determined by the network device is one time unit in M time units included in one subframe. Specifically, the network device determines the time unit according to the following method:

When the data transmission is downlink data transmission, the time unit is a time unit occupied by first downlink control information (DCI). The first DCI may include information used to indicate the downlink data transmission. In addition, after or when determining the time unit, the network device sends the first DCI to the terminal device.

Alternatively, when the data transmission is uplink data transmission, the time unit is a $K^{th}$ time unit counted from a time unit occupied by a second DCI. Herein, K is an integer that is greater than or equal to 4, and the second DCI may include information used to implicitly indicate the uplink data transmission. In addition, before, when, or after determining the time unit, the network device sends the second DCI to the terminal device.

In a specific implementation corresponding to the case mentioned above, for example, when the data transmission is PUCCH transmission, the PUCCH carries HARQ feedback information, the HARQ feedback information indicates a receiving state of a PDSCH, and the time unit is the $K^{th}$ time unit counted from the time unit occupied by the second DCI. Herein, K is an integer greater than or equal to 4, and the second DCI includes information used to indicate PDSCH transmission. For another example, when the data transmission is PUCCH transmission, the PUCCH carries HARQ feedback information, the HARQ feedback information indicates a receiving state of downlink semi-persistent scheduling (SPS) release signaling, and the time unit is the $K^{th}$ time unit counted from the time unit occupied by the second DCI. Herein, K is an integer greater than or equal to 4, and the second DCI is a DCI used to indicate SPS release signaling. For still another example, when the data transmission is PUSCH transmission, the time unit is the $K^{th}$ time unit counted from the time unit occupied by the second DCI. Herein, K is an integer greater than or equal to 4, and the second DCI includes information used to indicate the PUSCH transmission.

Figure 14:
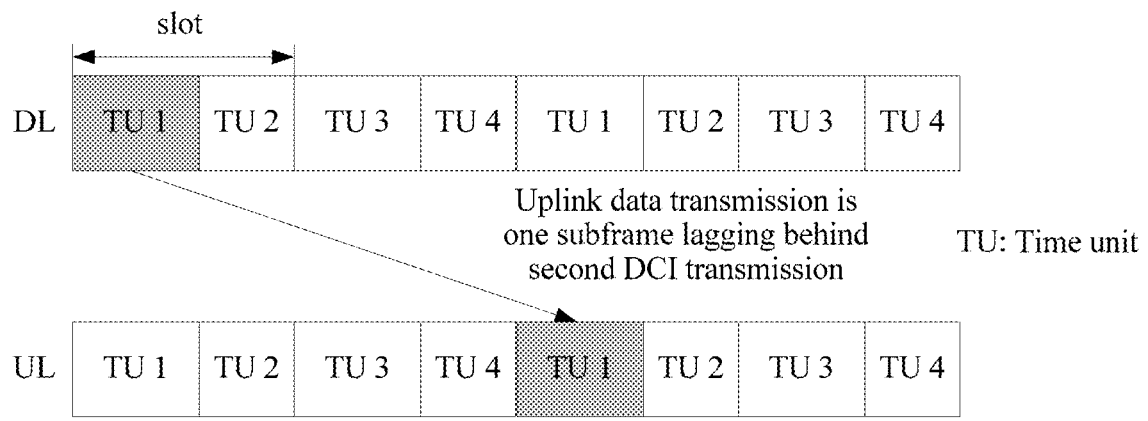
FIG. 14 is a schematic structural diagram of a location of a transmission resource on one subframe according to an embodiment of the present disclosure.

In a specific implementation corresponding to the case mentioned above, as shown in FIG. 14, for uplink transmission such as PUCCH transmission or PUSCH transmission, the second DCI occupies a time unit n, and the network device determines that a time unit n+K is the time unit. The time unit n+K is a $K^{th}$ time unit counted from the time unit n. Herein, K is a positive integer, and optionally, K=4. It is assumed that the subframe includes four time units and K=4. The network device sends the second DCI in a first time unit in a subframe whose subframe number is 0, and the network device may determine that a first time unit in a subframe whose subframe number is 1 is the time unit. Alternatively, it is assumed that the subframe includes two transmission units and K=4. The network device sends the second DCI in a second time unit in a subframe whose subframe number is 0, and the network device may determine that a second time unit in a subframe whose subframe number is 2 is the time unit.

Optionally, when the data transmission is PUSCH transmission, the time unit is a $K^{th}$ time unit counted from a time unit occupied by a physical HARQ indicator channel (PHICH). Herein, K is an integer greater than or equal to 4. In addition, after or when determining the time unit, the network device sends the PHICH to the terminal device.

Optionally, when the data transmission is PUCCH transmission, the PUCCH carries HARQ feedback information, the HARQ feedback information indicates a receiving state of a PDSCH, and the time unit is a $K^{th}$ time unit counted from a time unit occupied by the PDSCH. Herein, K is an integer greater than or equal to 4. In addition, before, when, or after determining the time unit, the network device sends the PDSCH to the terminal device.

For the terminal device, specifically, that the terminal device determines the transmission resource used to transmit the data may include:

The time domain resource occupied in the time domain by the transmission resource determined by the terminal device is one time unit in M time units included in one subframe. Specifically, the terminal device determines the time unit according to the following method:

Before or when determining the time unit, the terminal device receives the first DCI sent by the network device. When the data transmission is downlink data transmission, the time unit is a time unit occupied by first downlink control information (DCI). The first DCI may include information used to indicate the downlink data transmission.

Alternatively, before determining the time unit, the terminal device receives a second DCI sent by the network device. When the data transmission is uplink data transmission, the time unit is a $K^{th}$ time unit counted from a time unit occupied by a second DCI. Herein, K is an integer that is greater than or equal to 4, and the second DCI may include information used to implicitly indicate the uplink data transmission.

Optionally, before or when determining the time unit, the terminal device receives a PHICH sent by the network device. When the data transmission is PUSCH transmission, the time unit is a $K^{th}$ time unit counted from a time unit occupied by a physical HARQ indicator channel (PHICH), and K is an integer greater than or equal to 4.

Optionally, before determining the time unit, the terminal device receives a PDSCH sent by the network device. When the data transmission is PUCCH transmission, the PUCCH carries HARQ feedback information, the HARQ feedback information indicates a receiving state of the PDSCH, and the time unit is a $K^{th}$ time unit counted from a time unit occupied by the PDSCH. Herein, K is an integer greater than or equal to 4.

The time domain resource occupied in the time domain by the transmission resource (referred to as a first transmission resource herein for ease of the following description) that is used to transmit the data and that is determined by the network device is one time unit (referred to as an $i^{th}$ time unit herein for ease of the following description) in M time units included in one subframe. Optionally, the network device may further determine a third transmission resource used to transmit the data, and a time domain resource occupied by the third transmission resource in the time domain is a $j^{th}$ time unit in M time units included in one subframe. The first transmission resource and the third transmission resource carry same data. Performance of data transmission can be enhanced because same data can be repeatedly transmitted on the third transmission resource, thereby enlarging a coverage area of the data transmission.

Correspondingly, the time domain resource occupied in the time domain by the transmission resource (referred to as a first transmission resource herein for ease of the following description) that is used to transmit the data and that is determined by the terminal device is a time unit (referred to as an $i^{th}$ time unit herein for ease of the following description) in M time units included in one subframe. Optionally, the terminal device may further determine a third transmission resource used to transmit the data, and a time domain resource occupied by the third transmission resource in the time domain is a $j^{th}$ time unit in M time units included in one subframe. The first transmission resource and the third transmission resource carry same data.

Preferably, j=i+1, that is, the $i^{th}$ time unit is a time unit before the $j^{th}$ time unit.

Preferably, the first transmission resource and the third transmission resource occupy different frequency domain resources, so as to obtain a frequency diversity gain.

Specifically, when M=4, the first transmission resource occupies a first time unit in one subframe in the time domain, and the third transmission resource occupies a second time unit in the subframe in the time domain; or the first transmission resource occupies a third time unit in one subframe in the time domain, and the third transmission resource occupies a fourth time unit in the subframe in the time domain.

Optionally, the network device may send signaling to the terminal device. The signaling includes information used to indicate the third transmission resource, and the signaling is higher layer signaling or physical layer signaling. It should be noted that there is no definite sequence between determining the first transmission resource and determining the third transmission resource.

In the foregoing manner, a transmission coverage area can be enlarged when same data can be transmitted on two transmission resources, so that the foregoing manner is particularly applicable to a scenario in which uplink coverage is limited due to limited transmit power of a terminal device.

For step 102, that the network device performs the data transmission with the terminal device on the determined transmission resource may include:

when the data transmission is uplink data transmission, receiving, by the network device on the transmission resource, uplink data sent by the terminal device; or when the data transmission is downlink data transmission, sending, by the network device, the downlink data to the terminal device on the transmission resource.

For the terminal device, when the data transmission is uplink data transmission, the terminal device sends uplink data to the network device on the transmission resource; or when the data transmission is downlink data transmission, the terminal device receives, on the transmission resource, downlink data sent by the network device.

When the terminal device supports carrier aggregation, the network device further determines a state of the second transmission resource used to transmit the second data. This is as follows:

when the first data is first uplink data, and the second data is second uplink data, the network device receives, on the first transmission resource, the first uplink data sent by the terminal device, and receives, on the second transmission resource, the second uplink data sent by the terminal device; or when the first data is first downlink data, and the second data is second downlink data, the network device sends the first downlink data to the terminal device on the first transmission resource, and sends the second downlink data to the terminal device on the second transmission resource.

Correspondingly, when the first data is first uplink data, and the second data is second uplink data, the terminal device sends the first uplink data to the network device on the first transmission resource, and sends the second uplink data to the network device on the second transmission resource.

Alternatively, when the first data is first downlink data and the second data is second downlink data, the terminal device receives, on the first transmission resource, the first downlink data sent by the network device, and receives, on the second transmission resource, the second downlink data sent by the network device.

A state of the third transmission resource used to transmit the data is further determined for the network device, and step 102 may include:

when the data transmission is uplink data transmission, receiving, by the network device on the first transmission resource and the third transmission resource, uplink data sent by the terminal device; or when the data transmission is downlink data transmission, sending, by the network device, the downlink data to the terminal device on the first transmission resource and the third transmission resource.

Correspondingly, the terminal device also determines a state of the third transmission resource used to transmit the data. When the data transmission is uplink data transmission, the terminal device sends uplink data on the first transmission resource and the third transmission resource; or when the data transmission is downlink data transmission, the terminal device receives downlink data on the first transmission resource and the third transmission resource.

An embodiment of the present disclosure mainly describes a case in which the network device determines the transmission resource used to transmit the data. The time domain resource occupied by the transmission resource in the time domain is one of the N types of time domain resources, and a time length of any type of time domain resource in the N types of time domain resources is less than 1 ms. The prior art can support only transmission with a 1-millisecond time length. In comparison with the prior art, at least one type of time domain resource less than 1 ms is introduced to shorten a transmission time interval. Therefore, a data transmission latency can be effectively reduced, so as to meet a requirement on a low-latency service.

Figure 15:
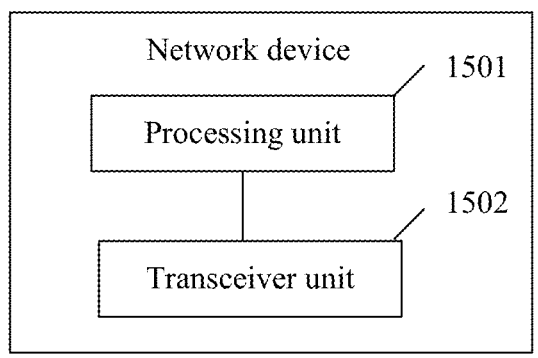
FIG. 15 is a schematic structural diagram of a network device according to an embodiment of the present disclosure.

FIG. 15 is a network device according to an embodiment of the present disclosure. The network device may be configured to execute the foregoing method shown in FIG. 1, and the network device includes a processing unit 1501 and a transceiver unit 1502.

The processing unit 1501 is configured to determine a transmission resource used to transmit data. A time domain resource occupied by the transmission resource in a time domain is one of N types of time domain resources, a time length of any type of time domain resource in the N types of time domain resources is less than 1 ms, and N is a positive integer.

The transceiver unit 1502 is configured to perform data transmission with a terminal device on the transmission resource determined by the processing unit.

A beneficial effect of this embodiment of the present disclosure is similar to that of the embodiment shown in FIG. 1, and details are not described herein again.

In this embodiment of the present disclosure, the N types of time domain resources include at least one type of time domain resource in types of time domain resources whose time lengths are respectively one symbol, two symbols, three symbols, four symbols, and one slot, and the one slot includes six or seven symbols.

In an example, when the transmission resource determined by the processing unit 1501 occupies at least two symbols in the time domain, the data transmitted by the transceiver unit 1502 includes a physical channel and a physical signal. The physical signal and the physical channel are respectively located on different symbols in the at least two symbols. For a specific process and a beneficial effect refer to those of the foregoing example shown in FIG. 2. It can be understood that these cases are merely examples used in this embodiment of the present disclosure, and the present disclosure includes these cases but is not limited thereto.

Specifically, when the transmission resource determined by the processing unit 1501 occupies four symbols in the time domain, the four symbols include: $N_{RS}^{sym}$ symbols used to transmit a physical signal and $4-N_{RS}^{sym}$ symbols used to transmit a physical channel, where $N_{RS}^{sym}$ is less than 4.

For example, when $N_{RS}^{sym}$ is equal to 2, the two symbols used to transmit a physical signal are first two symbols or middle two symbols of the four symbols; or when $N_{RS}^{sym}$ is equal to 1, the one symbol used to transmit a physical signal is a first symbol or a second symbol of the four symbols.

Specifically, when the transmission resource determined by the processing unit 1501 occupies three symbols in the time domain, the three symbols include: $N_{RS}^{sym}$ symbols used to transmit a physical signal and $3-N_{RS}^{sym}$ symbols used to transmit a physical channel, where RS is less than 3. For a specific process and a beneficial effect, refer to those of the foregoing example shown in FIG. 3. It can be understood that these cases are merely examples used in this embodiment of the present disclosure, and the present disclosure includes these cases but is not limited thereto.

For example, when $N_{RS}^{sym}$ is equal to 2, the two symbols used to transmit a physical signal may be located on first two symbols in the three symbols; or when $N_{RS}^{sym}$ is equal to 1, the one symbol used to transmit a physical signal is a first symbol or a second symbol in the three symbols.

Specifically, when the transmission resource determined by the processing unit 1501 occupies two symbols in the time domain, the two symbols includes one symbol used to transmit a physical signal, and the one symbol used to transmit a physical signal is a first symbol or a second symbol in the two symbols. For a specific process and a beneficial effect, refer to those of the foregoing example shown in FIG. 4. It can be understood that these cases are merely examples used in this embodiment of the present disclosure, and the present disclosure includes these cases but is not limited thereto.

Specifically, when the transmission resource determined by the processing unit 1501 occupies one symbol in the time domain, the symbol is used to transmit a physical channel.

Specifically, if the transmission resource determined by the processing unit 1501 occupies one slot in the time domain, when the one slot includes seven symbols, the one slot includes $N_{RS}^{sym}$ symbols used to transmit a physical signal and $7-N_{RS}^{sym}$ symbols used to transmit a physical channel, where $N_{RS}^{sym}$ is less than 7; or when the one slot includes six symbols, the one slot includes $N_{RS}^{sym}$ symbols used to transmit a physical signal and $6-N_{RS}^{sym}$ symbols used to transmit a physical channel, where $N_{RS}^{sym}$ is less than 6.

In another example, the transmission resource determined by the processing unit 1501 includes at least two REs, the data includes a physical signal and a physical channel, and the physical channel and the physical signal are located on different REs. For a specific process and a beneficial effect, refer to those of the foregoing example shown in FIG. 5, FIG. 6, FIG. 7, FIG. 8, FIG. 9, FIG. 10, FIG. 11, FIG. 12, or FIG. 13. It can be understood that these cases are merely examples used in this embodiment of the present disclosure, and the present disclosure includes these cases but is not limited thereto.

Specifically, the transmission resource determined by the processing unit 1501 includes at least one short resource block, and any short resource block in the at least one short resource block includes $N_{sc}^{RB} \times N_{sym}$ REs that occupy $N_{sc}^{RB}$ consecutive subcarriers in a frequency domain and occupy $N_{sym}$ consecutive symbols in the time domain. $N_{sym}$ is equal to a quantity of symbols occupied by the transmission resource in the time domain, and $N_{sym}$ and $N_{sc}^{RB}$ are positive integers. The any short resource block includes $N_{RS}^{RE}$ REs used to transmit the physical signal, and the $N_{RS}^{RE}$ REs used to transmit the physical signal are distributed in the frequency domain in a non-consecutive manner or in a comb shape. $N_{RS}^{RE}$ is a positive integer.

In another example, the time domain resource occupied in the time domain by the transmission resource determined by the processing unit 1501 is one of M time units included in one subframe, and any one of the M time units is one of the N types of time domain resources. For a specific process and a beneficial effect, refer to those of the foregoing example shown in FIG. 14. It can be understood that these cases are merely examples used in this embodiment of the present disclosure, and the present disclosure includes these cases but is not limited thereto.

Specifically, when one subframe includes M=4 time units, the four time units included in the subframe are orderly a first time unit, a second time unit, a third time unit, and a fourth time unit. An order of the four time units included in the subframe is similar to that in the foregoing method embodiment, and details are not described herein again.

Optionally, the four time units included in the subframe include: For uplink transmission, when a last symbol in the subframe is used to transmit a sounding RS SRS, the four time units included in the subframe are configured in the time domain according to the foregoing described order 4, order 5, or order 7; or the four time units included in the subframe include: When the one slot includes seven symbols and a quantity of PDCCH symbols of a control format indicator CFI carried by a physical control format indicator channel PCFICH or a quantity of PDCCH symbols of a higher layer signaling indicator carried by the PCFICH is 0 or 1, the four time units included in the subframe are configured in the time domain according to order 1 or order 4; or when the one slot includes seven symbols and a quantity of PDCCH symbols of a CFI or a quantity of PDCCH symbols of a higher layer signaling indicator is 2, 3, or 4, the four time units included in the subframe are configured in the time domain according to the foregoing described order 2, order 3, or order 5.

Correspondingly, when the time domain resource occupied in the time domain by the transmission resource determined by the processing unit is one time unit in the M time units included in the subframe, the processing unit 1501 is specifically configured to: determine that the transmission resource occupies one time unit in the M time units in the time domain.

Correspondingly, when the data transmission performed by the transceiver unit 1502 is downlink data transmission, the time unit determined by the processing unit 1501 is a time unit occupied by a first DCI, and the first DCI includes information used to indicate the downlink data transmission; or when the data transmission performed by the transceiver unit 1502 is uplink data transmission, the time unit determined by the processing unit 1501 is a $K^{th}$ time unit counted from a time unit occupied by a second DCI. Herein, K is an integer that is greater than or equal to 4, and the second DCI includes information used to implicitly indicate the uplink data transmission.

In this embodiment of the present disclosure, the transceiver unit 1502 is specifically configured to: when the data transmission is uplink data transmission, receive, on the transmission resource determined by the processing unit 1501, uplink data sent by the terminal device; or when the data transmission is downlink data transmission, send the downlink data to the terminal device on the transmission resource determined by the processing unit 1501.

In this embodiment of the present disclosure, when the N is greater than or equal to 2, at least two types of time domain resources in the N types of time domain resources have different time lengths.

FIG. 15 shows a possible schematic structural diagram of a network device related to the foregoing embodiments. The network device includes the processing unit 1501 and the transceiver unit 1502. It should be noted that a physical device corresponding to the processing unit related to the embodiments of the present disclosure may be a processor, and a physical device corresponding to the transceiver unit related to the embodiments of the present disclosure may further be a transceiver. It can be understood that the processor and the transceiver merely show a simplified design of the network device. In an actual application, the network device may include any quantity of transceivers, processors, controllers, memories, and the like. All network devices that can implement the present disclosure fall within the protection scope of the present disclosure.

Figure 16:
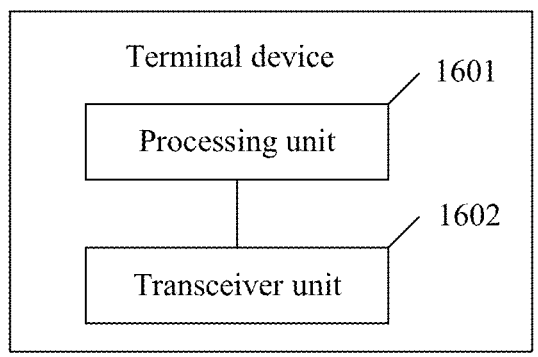
FIG. 16 is a schematic structural diagram of another terminal device according to an embodiment of the present disclosure.

FIG. 16 is a terminal device according to an embodiment of the present disclosure. The terminal device and the network device may be configured to perform the foregoing method shown in FIG. 1. The network device includes a processing unit 1601 and a transceiver unit 1602.

The processing unit 1601 is configured to determine a transmission resource used to transmit the data. A time domain resource occupied by the transmission resource in a time domain is one of N types of time domain resources, a time length of any type of the N types of time domain resources is less than 1 ms, and N is a positive integer.

The transceiver unit 1602 is configured to perform data transmission with a network device on the transmission resource determined by the processing unit.

A beneficial effect of this embodiment of the present disclosure is similar to that of the embodiment shown in FIG. 1, and details are not described herein again.

In this embodiment of the present disclosure, the N types of time domain resources include at least one type of time domain resource in types of time domain resources whose time lengths are respectively one symbol, two symbols, three symbols, four symbols, and one slot, and the one slot includes six or seven symbols.

In an example, when the transmission resource determined by the processing unit 1601 occupies at least two symbols in the time domain, the data transmitted by the transceiver unit 1602 includes a physical channel and a physical signal. The physical signal and the physical channel are respectively located on different symbols in the at least two symbols. For a specific process and a beneficial effect, refer to those of the foregoing example shown in FIG. 2. It can be understood that these cases are merely examples used in this embodiment of the present disclosure, and the present disclosure includes these cases but is not limited thereto.

Specifically, when the transmission resource determined by the processing unit 1601 occupies four symbols in the time domain, the four symbols include: $N_{RS}^{sym}$ symbols used to transmit a physical signal and $4-N_{RS}^{sym}$ symbols used to transmit a physical channel, and $N_{RS}^{sym}$ is less than 4.

For example, when $N_{RS}^{sym}$ is equal to 2, the two symbols used to transmit a physical signal are first two symbols or middle two symbols of the four symbols; or when $N_{RS}^{sym}$ is equal to 1, the one symbol used to transmit a physical signal is a first symbol or a second symbol of the four symbols.

Specifically, when the transmission resource determined by the processing unit 1601 occupies three symbols in the time domain, the three symbols include: $N_{RS}^{sym}$ symbols used to transmit a physical signal and 3-$N_{RS}^{sym}$ symbols used to transmit a physical channel, where $N_{RS}^{sym}$ is less than 3. For a specific process and a beneficial effect, refer to those of the foregoing example shown in FIG. 3. It can be understood that these cases are merely examples used in this embodiment of the present disclosure, and the present disclosure includes these cases but is not limited thereto.

For example, when $N_{RS}^{sym}$ is equal to 1, the one symbol used to transmit a physical signal is a first symbol or a second symbol in the three symbols; or when $N_{RS}^{sym}$ is equal to 2, the two symbols used to transmit a physical signal may be located on first two symbols in the three symbols.

Specifically, when the transmission resource determined by the processing unit 1601 occupies two symbols in the time domain, the two symbols includes one symbol used to transmit a physical signal, and the one symbol used to transmit a physical signal is a first symbol or a second symbol in the two symbols. For a specific process and a beneficial effect, refer to those of the foregoing example shown in FIG. 4. It can be understood that these cases are merely examples used in this embodiment of the present disclosure, and the present disclosure includes these cases but is not limited thereto.

Specifically, when the transmission resource determined by the processing unit 1601 occupies one symbol in the time domain, the symbol is used to transmit a physical channel.

Specifically, if the transmission resource determined by the processing unit 1601 occupies one slot in the time domain, when the one slot includes seven symbols, the one slot includes $N_{RS}^{sym}$ symbols used to transmit a physical signal 7-$N_{RS}^{sym}$ and symbols used to transmit a physical channel, where $N_{RS}^{sym}$ is less than 7; or when the one slot includes six symbols, the one slot includes $N_{RS}^{sym}$ symbols used to transmit a physical signal and 6-$N_{RS}^{sym}$ symbols used to transmit a physical channel, where $N_{RS}^{sym}$ is less than 6.

In another example, the foregoing describes from the perspective of the time domain that the N types of time domain resources may include at least one type of time domain resource in types of time domain resources whose time lengths are respectively one symbol, two symbols, three symbols, four symbols, and one slot, and the one slot may include six or seven symbols. The following describes another case from the perspective of the frequency domain, that is, the data may include a physical signal and a physical channel, and the physical channel and the physical signal are located on different REs in the transmission resource. For a specific process and a beneficial effect, refer to those of the foregoing example shown in FIG. 5, FIG. 6, FIG. 7, FIG. 8, FIG. 9, FIG. 10, FIG. 11, FIG. 12, or FIG. 13. It can be understood that these cases are merely examples used in this embodiment of the present disclosure, and the present disclosure includes these cases but is not limited thereto.

Specifically, the transmission resource determined by the processing unit 1601 includes at least one short resource block, and any short resource block in the at least one short resource block includes $N_{sc}^{RB} \times N_{sym}$ REs that occupy $N_{sc}^{RB}$ consecutive subcarriers in a frequency domain and occupy $N_{RS}^{sym}$ consecutive symbols in the time domain. $N_{sym}$ is equal to a quantity of symbols occupied by the transmission resource in the time domain, and $N_{sym}$ and $N_{sc}^{RB}$ are positive integers. The any short resource block includes $N_{RS}^{RE}$ REs used to transmit the physical signal, and the $N_{RS}^{RE}$ REs used to transmit the physical signal are distributed in the frequency domain in a non-consecutive manner or in a comb shape. $N_{RS}^{RE}$ is a positive integer.

In another example, the time domain resource occupied in the time domain by the transmission resource determined by the processing unit 1601 is one of M time units included in one subframe, and any one of the M time units is one of the N types of time domain resources.

Specifically, M=4, and the four time units included in the one subframe are orderly a first time unit, a second time unit, a third time unit, and a fourth time unit. An order of the four time units included in the one subframe is similar to that in the foregoing method embodiment, and details are not described herein again.

Optionally, the four time units included in the one subframe include: For uplink transmission, when a last symbol in the one subframe is used to transmit a sounding RS SRS, the four time units included in the one subframe are configured in the time domain according to the foregoing described order 4, order 5, or order 7.

Correspondingly, the four time units included in the subframe include: When the one slot includes seven symbols and a quantity of PDCCH symbols of a control format indicator CFI carried by a physical control format indicator channel PCFICH or a quantity of PDCCH symbols of a higher layer signaling indicator carried by the PCFICH is 0 or 1, the four time units included in the subframe are configured in the time domain according to order 1 or order 4; or when the one slot includes seven symbols and a quantity of PDCCH symbols of a CFI or a quantity of PDCCH symbols of a higher layer signaling indicator is 2, 3, or 4, the four time units included in the subframe are configured in the time domain according to the foregoing described order 2, order 3, or order 5.

Correspondingly, the processing unit 1601 is specifically configured to: determine one time unit in the M time units occupied by the transmission resource in the time domain. A location of the transmission resource is limited to one subframe by using the foregoing design. Therefore, the transmission resource is not distributed on two subframes, thereby avoiding increasing complexity of a scheduler of this apparatus.

Correspondingly, when the data transmission performed by the transceiver unit 1602 is downlink data transmission, the time unit determined by the processing unit 1601 is a time unit occupied by a first DCI, and the first DCI includes information used to indicate the downlink data transmission; or when the data transmission performed by the transceiver unit 1602 is uplink data transmission, the time unit determined by the processing unit 1601 is a $K^{th}$ time unit counted from a time unit occupied by a second DCI. Herein, K is an integer that is greater than or equal to 4, and the second DCI includes information used to implicitly indicate the uplink data transmission.

In this embodiment of the present disclosure, the transceiver unit 1602 is specifically configured to: when the data transmission is uplink data transmission, receive, on the transmission resource determined by the processing unit 1601, uplink data sent by the terminal device; or when the data transmission is downlink data transmission, send the downlink data to the terminal device on the transmission resource determined by the processing unit 1601.

In this embodiment of the present disclosure, when N is greater than or equal to 2, at least two types of time domain resources in the N types of time domain resources have different time lengths. Therefore, a time domain resource can be more efficiently occupied.

FIG. 16 shows a possible schematic structural diagram of a terminal device related to the foregoing embodiments. The terminal device includes the processing unit and the transceiver unit. It should be noted that a physical device corresponding to the processing unit related to the embodiments of the present disclosure may be a processor, and a physical device corresponding to the transceiver unit related to the embodiments of the present disclosure may further be a transceiver. It can be understood that the processor and the transceiver unit merely show a simplified design of the terminal device. In an actual application, the terminal device may include any quantity of transceivers, processors, controllers, memories, and the like. All terminal devices that can implement the present disclosure fall within the protection scope of the present disclosure.

Steps of the methods or algorithms described with reference to the content disclosed in the present disclosure may be implemented by using hardware, or may be implemented by executing a software instruction by a processor. The software instruction may include a corresponding software module, and the software module may be located in a RAM memory, a flash memory, a ROM memory, an EPROM memory, an EEPROM memory, a register, a hard disk, a removable hard disk, a CD-ROM, or any other form of storage medium known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

A person skilled in the art should be aware that in the foregoing one or more examples, functions described in the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present disclosure are further described in detail in the foregoing specific implementations. It should be understood that the foregoing descriptions are merely specific implementations of the present disclosure, but are not intended to limit the protection scope of the present disclosure. Any modification, equivalent replacement, or improvement made within the spirit and principle of the present disclosure shall fall within the protection scope of the present disclosure.

The invention claimed is:

1. An apparatus, comprising:
one or more processors, and
a non-transitory storage medium configured to store program instructions; wherein, when executed by the one or more processors, the program instructions cause the apparatus to:
determine a transmission resource for at least one physical uplink control channel (PUCCH), wherein a time domain resource occupied by the transmission resource is at least one time unit of M time units comprised in one subframe, each time unit of the M time units is one of N types of time domain resources, the N types of time domain resources comprise time domain resources whose time lengths are respectively one symbol, two symbols, three symbols, four symbols, and seven symbols, a time length of at least one type of time domain resource in the N types of time domain resources is less than 1 millisecond, and N is a positive integer and greater than 1; and
send the at least one PUCCH on the transmission resource, wherein:
the transmission resource comprises a first transmission resource and a third transmission resource,
the time domain resource occupied by the first transmission resource and the third transmission resource are separately an ith time unit and a jth time unit in M time units included in one subframe, wherein M is a positive integer, i is a positive integer and no greater than M, j is a positive integer and no greater than M, i is not equal to j, and
the first transmission resource and the third transmission resource occupy different frequency domain resources and carry same data.

2. The apparatus according to claim 1, wherein:
M=2; or
M=4, and the four time units comprised in the one subframe are orderly a first time unit, a second time unit, a third time unit, and a fourth time unit, wherein:
a time length of the first time unit is three symbols, a time length of the second time unit is four symbols, a time length of the third time unit is four symbols, and a time length of the fourth time unit is three symbols;
the $i^{th}$ time unit is the first time unit, the $j^{th}$ time unit is the second time unit; or
the $i^{th}$ time unit is the third time unit, the $j^{th}$ time unit is the fourth time unit.

3. The apparatus according to claim 2, wherein:
the four symbols of the second time unit or the third time unit comprise two symbols used to transmit a physical signal and two symbols used to transmit a physical channel, the two symbols used to transmit the physical signal are middle two symbols of the four symbols; or
the three symbols of the first time unit or the fourth time unit comprise one symbols used to transmit a physical signal and two symbols used to transmit a physical channel, the one symbol used to transmit the physical signal is the second symbol of the three symbols.

4. The apparatus according to claim 1, wherein the transmission resource is located in a first serving cell and a time length of the time domain resource occupied by the transmission resource is less than 1 millisecond;
wherein the program instructions further cause the apparatus to:
determine another transmission resource located in a second serving cell, wherein a time domain resource occupied by the another transmission resource is 1 millisecond or one subframe; and
send data on the another transmission resource.

5. The apparatus according to claim 1, wherein determine a transmission resource for at least one PUCCH, comprises:
determine, according to higher layer signaling or physical layer signaling, the time domain resource occupied by the transmission resource is one type of configurable time domain resource, wherein the higher layer signaling or the physical layer signaling indicates that the configurable time domain resource is which type or types of the N types of time domain resources.

6. The apparatus according to claim 1, wherein the program instructions further cause the apparatus to:

report information to a network device, wherein the information indicates that the apparatus supports which type or types of time domain resources.

7. A data transmission method, comprising:
determining a transmission resource for at least one physical uplink control channel (PUCCH), wherein a time domain resource occupied by the transmission resource is at least one time unit of M time units comprised in one subframe, each time unit of the M time units is one of N types of time domain resources, the N types of time domain resources comprise time domain resources whose time lengths are respectively one symbol, two symbols, three symbols, four symbols, and seven symbols, a time length of at least one type of time domain resource in the N types of time domain resources is less than 1 millisecond, and N is a positive integer and greater than 1; and
sending the at least one PUCCH on the transmission resource, wherein:
the transmission resource comprises a first transmission resource and a third transmission resource,
the time domain resource occupied by the first transmission resource and the third transmission resource are separately an ith time unit and a jth time unit in M time units included in one subframe, wherein M is a positive integer, i is a positive integer and no greater than M, j is a positive integer and no greater than M, i is not equal to j, and
the first transmission resource and the third transmission resource occupy different frequency domain resources and carry same data.

8. The method according to claim 7, wherein:
M=2; or
M=4, and the four time units comprised in the one subframe are orderly a first time unit, a second time unit, a third time unit, and a fourth time unit, wherein:
a time length of the first time unit is three symbols, a time length of the second time unit is four symbols, a time length of the third time unit is four symbols, and a time length of the fourth time unit is three symbols;
the $i^{th}$ time unit is the first time unit, the $j^{th}$ time unit is the second time unit; or
the $i^{th}$ time unit is the third time unit, the $j^{th}$ time unit is the fourth time unit.

9. The method according to claim 8, wherein:
the four symbols of the second time unit or the third time unit comprise two symbols used to transmit a physical signal and two symbols used to transmit a physical channel, the two symbols used to transmit the physical signal are middle two symbols of the four symbols; or
the three symbols of the first time unit or the fourth time unit comprise one symbols used to transmit a physical signal and two symbols used to transmit a physical channel, the one symbol used to transmit the physical signal is the second symbol of the three symbols.

10. An apparatus, comprising:
one or more processors, and
a non-transitory storage medium configured to store program instructions; wherein, when executed by the one or more processors, the program instructions cause the apparatus to:
determine a transmission resource for at least one physical uplink control channel (PUCCH), wherein a time domain resource occupied by the transmission resource is at least one time unit of M time units comprised in one subframe, each time unit of the M time units is one of N types of time domain resources, the N types of time domain resources comprise time domain resources whose time lengths are respectively one symbol, two symbols, three symbols, four symbols, seven symbols, a time length of at least one type of time domain resource in the N types of time domain resources is less than 1 millisecond, and N is a positive integer and greater than 1; and
receive the at least one PUCCH on the transmission resource, wherein:
the transmission resource comprises a first transmission resource and a third transmission resource,
the time domain resource occupied by the first transmission resource and the third transmission resource are separately an ith time unit and a jth time unit in M time units included in one subframe, wherein M is a positive integer, i is a positive integer and no greater than M, j is a positive integer and no greater than M, i is not equal to j, and
the first transmission resource and the third transmission resource occupy different frequency domain resources and carry same data.

11. The apparatus according to claim 10, wherein M=2.
12. The apparatus according to claim 10, wherein:
M=4, and the four time units comprised in the one subframe are orderly a first time unit, a second time unit, a third time unit, and a fourth time unit, wherein:
a time length of the first time unit is three symbols, a time length of the second time unit is four symbols, a time length of the third time unit is four symbols, and a time length of the fourth time unit is three symbols;
the ith time unit is the first time unit, the jth time unit is the second time unit; or
the ith time unit is the third time unit, the jth time unit is the fourth time unit.

13. The apparatus according to claim 12, wherein:
the four symbols of the second time unit or the third time unit comprise two symbols used to transmit a physical signal and two symbols used to transmit a physical channel, the two symbols used to transmit the physical signal are middle two symbols of the four symbols; or
the three symbols of the first time unit or the fourth time unit comprise one symbols used to transmit a physical signal and two symbols used to transmit a physical channel, the one symbol used to transmit the physical signal is the second symbol of the three symbols.

14. A method, comprising:
determining a transmission resource for at least one physical uplink control channel (PUCCH), wherein a time domain resource occupied by the transmission resource is at least one time unit of M time units comprised in one subframe, each time unit of the M time units is one of N types of time domain resources, the N types of time domain resources comprise time domain resources whose time lengths are respectively one symbol, two symbols, three symbols , four symbols, seven symbols, a time length of at least one type of time domain resource in the N types of time domain resources is less than 1 millisecond, and N is a positive integer and greater than 1; and
receiving the at least one PUCCH on the transmission resource, wherein:
the transmission resource comprises a first transmission resource and a third transmission resource,
the time domain resource occupied by the first transmission resource and the third transmission resource are separately an ith time unit and a jth time unit in M time units included in one subframe, wherein M is a positive integer, i is a positive integer and no greater than M, j is a positive integer and no greater than M, i is not equal to j, and the first transmission resource and the third transmission resource occupy different frequency domain resources and carry same data.

15. The method according to claim 14, wherein:

M=2; or

M=4, and the four time units comprised in the one subframe are orderly a first time unit, a second time unit, a third time unit, and a fourth time unit, wherein: a time length of the first time unit is three symbols, a time length of the second time unit is four symbols, a time length of the third time unit is four symbols, and a time length of the fourth time unit is three symbols; the ith time unit is the first time unit, the jth time unit is the second time unit; or the ith time unit is the third time unit, the jth time unit is the fourth time unit.

\* \* \* \* \*

UNITED STATES PATENT AND TRADEMARK OFFICE
CERTIFICATE OF CORRECTION

| | |
|---|---|
| PATENT NO. | : 11,601,958 B2 |
| APPLICATION NO. | : 17/100558 |
| DATED | : March 7, 2023 |
| INVENTOR(S) | : Chaojun Li and Sha Ma |

It is certified that error appears in the above-identified patent and that said Letters Patent is hereby corrected as shown below:

In the Claims

In Column 36, In Line 24, In Claim 12, delete "M-4," and insert -- M=4, --.

Signed and Sealed this
Seventeenth Day of October, 2023

Katherine Kelly Vidal
*Director of the United States Patent and Trademark Office*